(12) United States Patent
Edgar

(10) Patent No.: US 6,442,301 B1
(45) Date of Patent: Aug. 27, 2002

(54) APPARATUS AND METHOD FOR DEFECT CHANNEL NULLING

(75) Inventor: Albert D. Edgar, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 08/999,421

(22) Filed: Dec. 29, 1997

Related U.S. Application Data

(60) Provisional application No. 60/035,763, filed on Jan. 6, 1997.

(51) Int. Cl.[7] ................................................ G06K 9/40
(52) U.S. Cl. ...................... 382/275; 382/254; 358/463; 358/487; 356/237.1; 356/239.1; 250/330; 250/341.8; 250/339.11
(58) Field of Search ................................. 382/254, 275; 358/463, 487, 506; 250/330, 341.1, 341.8, 339.11; 356/443, 444, 237.1, 239.1

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |

(List continued on next page.)

FOREIGN PATENT DOCUMENTS

| | | | | |
|---|---|---|---|---|
| DE | 28 21 868 A1 | 11/1979 | | G01N/21/32 |
| DE | 196 36 867 C1 | 1/1998 | | H04N/5/21 |
| EP | 1 547 811 | 6/1979 | | H04N/3/36 |
| EP | 0 422 220 A1 | 4/1991 | | A61B/6/03 |
| EP | 0 482 790 B1 | 4/1992 | | H04N/1/40 |
| EP | 0 527 097 A2 | 2/1993 | | H04N/1/40 |
| EP | 0 569 142 A1 | 11/1993 | | H04N/5/253 |
| EP | 0 624 848 A2 | 11/1994 | | G06F/15/68 |
| EP | 0 699 753 A2 | 8/1995 | | H04N/1/407 |
| EP | 0 716 538 A2 | 6/1996 | | H04N/1/50 |
| EP | 0 751 670 A2 | 1/1997 | | H04N/1/10 |
| EP | 0 768 621 A2 | 4/1997 | | G06T/5/20 |
| EP | 0 794 454 A2 | 9/1997 | | G03B/27/73 |
| EP | 0 816 833 A2 | 1/1998 | | G01N/21/88 |

(List continued on next page.)

OTHER PUBLICATIONS

PCT Search Report for PCT/US00/25478, dated Nov. 29, 2000.

(List continued on next page.)

*Primary Examiner*—Thomas D. Lee
(74) *Attorney, Agent, or Firm*—Baker Botts L.L.P.

(57) ABSTRACT

A method of and apparatus for removing the effects of surface and near surface image storage media defects from a scanned image using an infrared record as a norming control. Each pixel in a visible channel of the scanned images is divided by the corresponding pixel in the associated infrared control channel after it has been altered in gain to match the degree of defect in the visible channel. By appropriately altering the gain prior to dividing the pixel information, imbalances between the visible and infrared records which would leave defect residue after the division are reduced or eliminated. To remove defect residue, a degree of nulling is established for each defect region based on the visible and infrared content in that region. In one embodiment, the articulation gain is multiplicatively applied to the logarithm of the visible and infrared records. To prevent variations in articulation gain from mottling brightness, the articulation gain is applied to details extracted through a high pass filter. In this embodiment, the image is divided into frequency bands in a pyramid structure, and separate articulation gain is applied to each band. The articulation gains are calculated using the cross-correlation between the visible and infrared images within a region to null the component of the visible channel matching the defect detected by the infrared channel. Gain limits are set based on correlations measured over the entire image.

44 Claims, 18 Drawing Sheets

U.S. PATENT DOCUMENTS

| | | | | |
|---|---|---|---|---|
| 4,302,108 A | 11/1981 | Timson | ................... | 356/359 |
| 4,462,860 A | 7/1984 | Szmanda | ................... | 156/626 |
| 4,670,779 A | 6/1987 | Nagano | ................... | 358/75 |
| 4,677,465 A | 6/1987 | Alkofer | ................... | 358/80 |
| 4,680,638 A | 7/1987 | Childs | ................... | 358/214 |
| 4,700,229 A * | 10/1987 | Herrmann et al. | ................... | 382/275 |
| 4,775,238 A | 10/1988 | Weber | ................... | 356/431 |
| 4,796,061 A | 1/1989 | Ikeda et al. | ................... | 355/73 |
| 4,845,551 A | 7/1989 | Matsumoto | ................... | 358/80 |
| 4,933,566 A | 6/1990 | Masaaki et al. | ................... | 250/563 |
| 4,937,720 A | 6/1990 | Kirchberg | ................... | 363/41 |
| 4,969,045 A | 11/1990 | Haruki et al. | ................... | 358/228 |
| 4,972,091 A | 11/1990 | Cielo et al. | ................... | 250/562 |
| 4,989,973 A | 2/1991 | Noso et al. | ................... | 356/239 |
| 4,994,918 A | 2/1991 | Lingemann | ................... | 358/214 |
| 5,003,379 A | 3/1991 | Moore, Jr. et al. | ................... | 358/54 |
| 5,010,401 A | 4/1991 | Murakami et al. | ................... | 358/136 |
| 5,047,968 A | 9/1991 | Carrington et al. | ................... | 364/574 |
| 5,058,982 A | 10/1991 | Katzir | ................... | 385/33 |
| 5,091,972 A | 2/1992 | Kwon et al. | ................... | 382/54 |
| 5,097,521 A | 3/1992 | Massmann | ................... | 382/54 |
| 5,149,960 A | 9/1992 | Dunne et al. | ................... | 250/226 |
| 5,155,596 A | 10/1992 | Kurtz et al. | ................... | 358/214 |
| 5,200,817 A | 4/1993 | Birnbaum | ................... | 358/80 |
| 5,266,805 A | 11/1993 | Edgar | ................... | 250/330 |
| 5,267,030 A | 11/1993 | Giorgianni et al. | ................... | 358/527 |
| 5,291,286 A | 3/1994 | Murakami et al. | ................... | 348/469 |
| 5,311,310 A | 5/1994 | Jozawa et al. | ................... | 348/416 |
| 5,335,086 A | 8/1994 | Kitamura | ................... | 358/431 |
| 5,371,542 A | 12/1994 | Pauli et al. | ................... | 348/262 |
| 5,447,811 A | 9/1995 | Buhr et al. | ................... | 430/20 |
| 5,448,380 A | 9/1995 | Park | ................... | 358/520 |
| 5,452,018 A | 9/1995 | Capitant et al. | ................... | 348/651 |
| 5,465,155 A | 11/1995 | Edgar | ................... | 358/500 |
| 5,465,163 A | 11/1995 | Yoshihara et al. | ................... | 358/444 |
| 5,477,345 A | 12/1995 | Tse | ................... | 358/500 |
| 5,509,086 A | 4/1996 | Edgar et al. | ................... | 382/167 |
| 5,516,608 A | 5/1996 | Hobbs et al. | ................... | 430/30 |
| 5,552,904 A | 9/1996 | Ryoo et al. | ................... | 358/518 |
| 5,561,611 A | 10/1996 | Avinash | ................... | 364/553 |
| 5,565,931 A | 10/1996 | Girod | ................... | 348/675 |
| 5,568,270 A | 10/1996 | Endo | ................... | 358/298 |
| 5,581,376 A | 12/1996 | Harrington | ................... | 358/518 |
| 5,582,961 A | 12/1996 | Giorgianni et al. | ................... | 430/508 |
| 5,583,950 A | 12/1996 | Prokoski | ................... | 382/212 |
| 5,589,887 A | 12/1996 | Wischermann | ................... | 348/616 |
| 5,608,547 A | 3/1997 | Nakatani et al. | ................... | 358/505 |
| 5,641,596 A | 6/1997 | Gray et al. | ................... | 430/21 |
| 5,666,443 A | 9/1997 | Kumashiro | ................... | 382/266 |
| 5,673,336 A | 9/1997 | Edgar et al. | ................... | 382/167 |
| 5,721,624 A | 2/1998 | Kumashiro et al. | ................... | 358/450 |
| 5,726,773 A | 3/1998 | Mehlo et al. | ................... | 358/474 |
| 5,729,631 A | 3/1998 | Wober et al. | ................... | 382/232 |
| 5,771,107 A | 6/1998 | Fujimoto et al. | ................... | 358/464 |
| 5,808,674 A | 9/1998 | Adams, Jr. et al. | ................... | 348/273 |
| 5,892,595 A | 4/1999 | Yamakawa et al. | ................... | 358/530 |
| 5,923,042 A | 7/1999 | Mietta et al. | ................... | 250/559.06 |
| 5,930,388 A | 7/1999 | Murakami et al. | ................... | 382/167 |
| 5,963,662 A | 10/1999 | Vachtsevanos et al. | ................... | 382/150 |
| 5,969,372 A | 10/1999 | Stavely et al. | ................... | 250/559.42 |
| 5,979,011 A | 11/1999 | Miyawaki et al. | ................... | 15/308 |
| 5,982,941 A | 11/1999 | Loveridge et al. | ................... | 382/260 |
| 5,982,951 A | 11/1999 | Katayama et al. | ................... | 250/559.42 |
| 5,991,444 A | 11/1999 | Burt et al. | ................... | 382/232 |
| 6,005,987 A | 12/1999 | Nakamura et al. | ................... | 382/294 |
| 6,057,040 A | 5/2000 | Hage | ................... | 428/447 |
| 6,075,905 A | 6/2000 | Herman et al. | ................... | 382/284 |
| 6,078,051 A | 6/2000 | Banton et al. | ................... | 250/341.1 |
| 6,078,701 A | 6/2000 | Hsu et al. | ................... | 382/294 |
| 6,101,273 A | 8/2000 | Matama | ................... | 382/169 |
| 6,128,416 A | 10/2000 | Oura | ................... | 382/284 |
| 6,239,886 B1 | 5/2001 | Klassen et al. | ................... | 358/518 |

FOREIGN PATENT DOCUMENTS

| | | | | |
|---|---|---|---|---|
| EP | 0 816 833 A3 | 8/1998 | ................... | G01N/21/88 |
| EP | 0 893 914 A2 | 1/1999 | ................... | H04N/5/253 |
| GB | 2 283 633 A | 5/1995 | ................... | H04N/5/262 |
| JP | 4-291139 | 10/1992 | ................... | G01N/21/89 |
| JP | 11185028 | 7/1999 | ................... | G06T/1/00 |
| JP | 2000-13604 | 1/2000 | ................... | H04N/1/409 |
| JP | 2000-196813 A | 7/2000 | ................... | H04N/01/04 |
| WO | WO 84/02019 | 5/1984 | ................... | G06F/15/20 |
| WO | WO 89/06890 | 7/1989 | ................... | H04N/3/36 |
| WO | WO 90/01240 | 2/1990 | ................... | H04N/1/40 |
| WO | WO 91/09493 | 6/1991 | ................... | H04N/5/127 |
| WO | WO 92/05469 | 4/1992 | ................... | G03B/27/53 |
| WO | WO 95/15530 | 6/1995 | ................... | G06F/17/14 |
| WO | WO 97/16028 | 5/1997 | ................... | H04N/7/30 |
| WO | WO 98/31142 | 7/1998 | ................... | H04N/5/253 |
| WO | WO 98/34397 | 8/1998 | | |
| WO | WO 99/40729 | 8/1999 | ................... | H04N/9/11 |
| WO | WO 01/48694 | 7/2001 | ................... | G06T/5/00 |

OTHER PUBLICATIONS

EP 0 569 142 A1: Inventor –Albert Durr Edgar, Applicant – IBM, System and Methof for Image Recovery –Application No. 93302897.9 (Date of Filing: Apr. 14, 1993), Specification –12 pages., Drawings –6 pages.; Bulletin 93/45.

EP 0 816 833 A2: Inventor –Grahma Bradburn, Applicant – Fujifilm Electronic Imaging Limited, An Illumination Unit and Illumination Method –Application No. 97304545.9 (Date of Filing: Jun. 26, 1997), Specification –7 pages, Drawings –4 pages,; Bulletin 1998/02.

WO 90/01240: Inventor –Martin Kaplan, Applicatn –Eastman Kodak Company, Film Noise Reduction by Application of Bayes Rheorem to Positive/Negative Film –Appliction No. PCT/US89/03052 (Date of Filing: Jul. 17, 1989), Specification –45 pages., Drawings –7 pages.

WO 91/09493: Inventor –COK, David, Roy, Applicant – Eastman Kodak Company, Method for Deriving Noise–Reduced Estimates of Colour Signal Parameters from Multiple Colour/Luminance Image Sensor Outputs–Appliction No. PCT/US90/07142, Specification –25 pages., Drawings –1 page.

* cited by examiner

APPARATUS AND METHOD FOR DEFECT CHANNEL NULLING

RELATED APPLICATION

This application claims the benefit of U.S. Provisional application Ser. No. 60/035,763, filed Jan. 6, 1997.

FIELD OF THE INVENTION

This invention relates to electronic image enhancement and recovery, and more particularly to a method and apparatus which compensate for the effects of defects of the media on which the image is stored.

BACKGROUND OF THE INVENTION

Ever since the first image of an object was captured on film, a serious problem became apparent: imperfections in and on the recording medium itself which distort and obscure the original image that was sought to be captured. This non-image imperfection problem continues to plague the field of image capture and reproduction to the present day. These imperfections occur in many forms including dust, scratches, fingerprints, smudges, and the like.

The film industry has been concerned that the problem caused by these non-image imperfections may jeopardize the long term future of analog images. Notwithstanding the significant efforts that have been made to solve the problem, it nevertheless persists. This is particularly true with respect to enlargements and high resolution scans. Thus, the problem is becoming even more acute and recognized as resolutions increase. Furthermore, multimedia applications have brought widespread attention to the problem with the increase in film scanning for computer applications.

The non-image imperfection problems occur more frequently with negatives than with transparencies because (1) viewing the negative requires a light to dark ratio gain (also known as a "gamma") of about two to one; whereas viewing a transparency is less demanding and (2) filmstrips are subject to more contact than are mounted transparencies. Some imperfections may be present in fresh photographic film, for example, media surface waves or microbubbles in the emulsion. Improper processing may also introduce non-image imperfection problems, for example mild reticulation or residual unbleached silver. Some non-image imperfection problems are introduced through improper handling of the image media which may leave oily fingerprints and other surface contaminants or cause physical damage such as scratches which distort the view of the image. Improper storage may also leave the film further exposed to defect inducing environmental influences such as dust and chemicals. Archival polypropylene sleeves employed to protect negatives contribute to the problem by leaving hairline surface scratches as the negatives are pulled out and replaced into the sleeves. As illustrated by the above examples, non-image imperfections may arise out of one or more of the following: film emulsion defects; improper processing; and improper handling or storage which may cause extraneous matter accumulation or scratches on the image media.

Numerous measures have been developed in the art in an attempt to address these problems, particularly with respect to captured high resolution images. Generally speaking, these measures are in the nature of prevention and labor intensive minimization of non-image defects. One approach has been that of preventing introduction of non-image defects in the development process itself. Expensive anti-static equipment, including spray machines to neutralize dust attracting charges, are employed by some photo finishers. Photo finishers also attempted to solve some of the problems by employing diffuse light source enlargers that help reduce the effects of refraction of the light due to imperfections in the photo finishing processes.

Another approach used in the art involves minimizing the effects of these imperfections once they are present by various correction techniques, most of which are manual and thus highly labor-intensive and expensive. For example, during the photo finishing process, a highly trained individual might spend a great deal of time using various spotting dyes and an extremely small spotting brush in an effort to essentially paint out the imperfections in a reproduced or printed image. Another technique is to wipe on or immerse the negatives in a light oil in an attempt to optically fill scratches.

As the art has developed, various attempts have been made to automate the correction process, particularly with respect to digital image systems. In such systems, once an imperfection has been detected, various "fill" algorithms are used to correct the image at the imperfection site. Nevertheless, heuristics or human intervention has been required to detect the imperfections with a subjective threshold. Typically the area identified to be corrected in this manner is much larger than necessary, in part due to application of these subjective criteria for detecting defective areas.

Automated methods have also been developed for detecting imperfect areas in recording media, as described in German patent 2821868.0 published Nov. 22, 1979, and entitled "Method and Device for Detecting Recording and Counting of Mechanical Damage to Moving Bands, for Example Films." The approach discussed focuses on determining the quantity of defects and shutting down processing if that measured quantity exceeds some predetermined maximum level of defects. In this system a source of infrared energy impinges upon the film medium. A scanned infrared image of the film in question is then taken by sensors detecting reflection of the infrared energy from the film surface. However, several limitations are present in the system disclosed by the patent.

First, its purpose is not to correct the effects of such detected film defects present on the film image. Instead, the system is implemented simply to monitor the prevalence of these defects in an automated photographic development process whereby the process can be automatically shut down if the defect rate exceeds a prescribed level. The optical infrared path is a reflective one from the infrared source to the infrared sensor which is typically different from the other sensors utilized for image processing. The infrared image is not recorded in registry with any other scanned images from the visual portion of the electromagnetic spectrum. Registry refers to the precise alignment of two related images, plates, or impressions so that they are held in position relative to each other. The fact that this prior art system does not record the infrared image in registry with any other images taken of the film is a disadvantage which in and of itself renders it extremely difficult to subtract out the effect of such imperfections noted in the infrared image from similar defects present in the visual record of the image.

In another prior system disclosed by the present inventor, a method which compensates for the effects of storage media defects on image data is disclosed by deriving from the medium separate images in the red, green, blue and infrared portions of the electromagnetic spectrum, each corresponding to the image stored therein As disclosed in U.S. Pat. No. 5,266,805 issued to the present inventor on Nov. 30, 1993, red, green, blue and infrared light is sequentially directed at one side of the film by means of a light source and color filter wheel. Corresponding red, green, blue, and infrared images formed by that portion of the light being transmitted through the film are digitally captured from the opposite side of the film. The images are preferably captured in registry to facilitate subtracting out the effect of imperfections at locations in the infrared record from corresponding locations in the red, green, and blue images. The imperfections may either substantially reduce or totally occlude the infrared light. However, remaining portions of the medium having the desired image without such imperfections are essentially uniformly transmissive to infrared light. These imperfection-free portions have variable transmissivity in the visual spectrum which is determined by the image developed on the film. Accordingly, the infrared image may serve as an indicator or map of the spatial position of these non-image imperfections on and in the medium, thereby allowing determination of the location and removal of the defects so that the underlying desired image may be recovered.

In order to remove film defects from a scanned film image, an infrared image record is used as a norming channel by dividing each pixel in a visible channel (red, blue, or green) by the corresponding pixel in the associated infrared channel. Although this improves the image, variations in scanner contrast across the density image of the film, variations in image focus, variations in illumination aperture and variations in the way defects respond to infrared light cause imbalances between the visible and infrared records leaving defects in the resulting image after the division. This process typically decreases the level of defects caused by storage of the image on a medium to within approximately 10% of their complete elimination. Although greatly improved relative to the uncorrected original image, the nulling of defects achieved via division with the infrared image record is not sufficient for some purposes. It is, therefore, desirable to have a method insuring that defect nulling approaches 100% elimination for these purposes.

When a transparent film is viewed, several factors attenuate light. The actual image attenuates light by dye absorption. In color film, each dye is specific to one color (red, green, or blue), and none of the three color dyes attenuate infix light Defects and imperfections attenuate incident light by bending the light outside the angle seen by the lens. For example, scratches, fingerprints, small flecks of dust, air bubbles, and other imperfections refract, or bend, light away from the lens, and thus appear as darker areas in the stored image. This refraction by defects is nearly the same in infrared light as in visible light; therefore, an infrared image shows the location and magnitude of defects without the visible image. For any given pixel, if the visible measurement is divided by the infrared measurement, any attenuation caused by defects will be divided out, in theory leaving only the attenuation from the visible dye image. The theory of infrared division is surprisingly powerful.

In practice, however, it was found that defects did not attenuate infrared light exactly the same as visible light. The discrepancies between theory and practice are attributable to several factors. In particular, the index of refraction is slightly different between infrared and visible light For example, (1) some dust flecks, even though very thin, may absorb some light; (2) the infrared and visible light sources in the scanner may not be precisely aligned causing rays bent by a defect to be "seen" somewhat differently under infrared light than by visible light; and (3) the imaging system in the scanner typically has less sharpness when using infrared as compared to visible light. Because of these discrepancies, if the visible record is simply divided by the infrared record as in the method disclosed by above-referenced U.S. Pat. No. 5,266,805, defects are greatly attenuated but not entirely eliminated. That method leaves a ghost, or residue, of the defect that still requires some type of manual intervention to fix. It is an object of the present invention to eliminate manual intervention in correction of defects.

Accordingly, it is an advantage of the present invention to enhance image recovery and eliminate effects of media surface defects on images stored in that media.

To achieve this and other objects which will become readily apparent upon reading the attached disclosure and appended claims, an improved method of and apparatus for defect channel nulling which significantly reduces the effect of defects on the image recording medium is provided. Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

A method and apparatus for nulling the effect of media defects introduced by storing an image on a medium. Red, blue, and green image signals are collected by passing red, blue, and green light through a medium containing an image and having some surface defects. The collected red, blue and green image signals are affected by the presence of image medium defects. A defect signal indicating the defects of the image storage medium is received from the same defective image storage medium. The defect signal is in register with the image signal. Gain is applied to the defect signal to generate a normalized defect signal. The normalized defect signal is then subtracted from the image signal to generate a recovered image signal. The defect signal and recovered image signal are compared, and from this comparison a second gain is derived which is proportional to the degree that the deterioration indicated by the defect signal is included in the image signal. This second gain is then applied to the defect signal and this now normalized defect signal is then subtracted from the image signal to generate a recovered image signal to minimize the effects of defects due to storage, handling, processing or which are inherent to the medium prior to recording of any image.

BRIEF DESCRIPTION OF THE DRAWINGS

FIGS. 7A, 7B, 7C, and 7D are diagrams which illustrate the process of pyramid upsizing.

DETAILED DESCRIPTION

Figure 1:
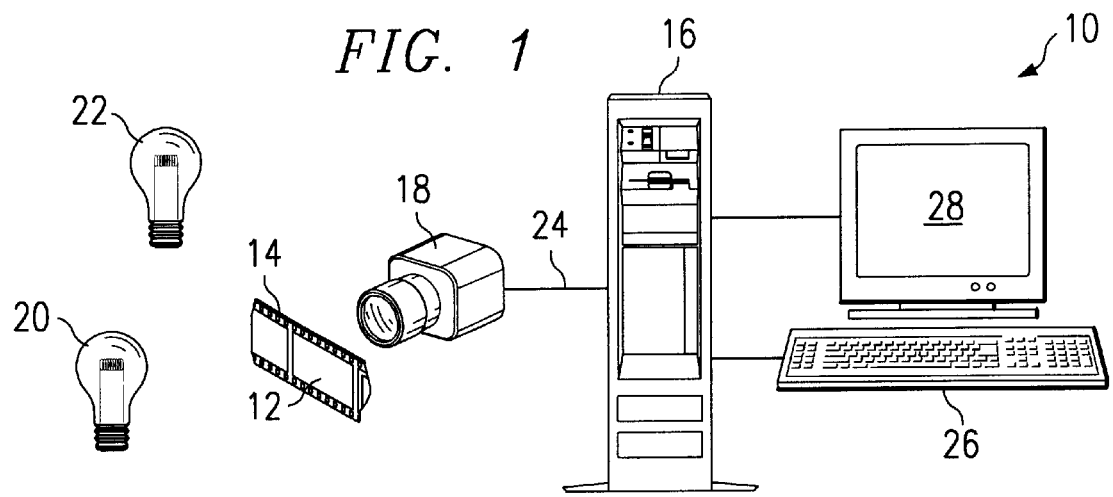
FIG. 1 is a schematic representation of a representative system for implementing the invention.

FIG. 1 is a schematic illustration of a representative system 10 for both capturing a visible image and an infrared image from the frame 12 of film 14 and storing the data in a suitable computer 16 for additional processing as further described hereinafter. An appropriate sensor, such as a color camera 18, receives image information from the frame 12 when it is illuminated by a light source, such as visible light source 20 or infrared light source 22. The process of generating sequential images may of course be automated as shown generally by the control line 24 from the computer 16 to the image generating components of the system 10 as is well known in the art. A keyboard 26 provides a conventional user interface to the computer 16, and a color monitor 28 is further provided for viewing the various images as desired.

When implemented, the present invention, unlike the prior art, nulls defects even in the case where there are discrepancies between the records. The present invention nulls, that is to say eliminates by subtraction, the effects of surface and near surface defects on the image media. The processing computer 16 is, in effect, given not only a visible record containing both image and defect information but also an infrared record containing only the defect information. In a preferred embodiment, the infrared record further consists of a gain control to adjust the intensity of the information in the infrared record. In practice, the gain control needs to be adjusted over a somewhat limited range. This range may only need to be a few percent, such as between zero and five percent The computer also has the ability to adjust the gain control to achieve the best nulling effect after the division process, such that none of the defect appears in the image, either as a positive ghost or as a negative ghost.

An overview of how the gain is used to control the intensity of the information contained in the infrared record will be described next. This description will cover use of the gain in two different ways. It may be either multiplied by the image information, or the image information may be raised to the power of the gain.

In the first type of use, assume that the gain is a constant, which when multiplied by the information in the infrared record, gives an infrared product. The information in the visible record is then divided by the infrared product. The resulting corrected image will be made brighter or dimmer by the gain constant depending on whether the constant is less than or greater than one respectively. However, using the gain constant as a simple multiplier will produce no resulting effect on the degree of defect nulling since the entire corrected image will have been subjected to the same gain constant.

In the second type of use, the infrared record data is raised to the power of the gain, which produces an indication of "intensity." In the context of nulling, a definition of intensity is the contrast measured (that is to say, the ratio of light to dark or gamma). The infrared record is raised to the power of the gain. The image data is then divided by the infrared data after it has been raised to the power of the gain. For example, supposing a particular defect absorbs 20% of the light. Without the defect, the visible signal might measure 50% and the infrared signal 100%. With the defect the visible signal would measure 50%* (100%−20%)=40% and the infrared signal would measure 100%* (100%−20%)= 80%. To further facilitate the manipulation of the image data, the visible and infrared records are converted to natural logarithms. Use of logarithms is expedient because it not only changes the division of linear visible data by the linear infrared data to a subtraction of the log infrared data from the log visible data, but raising the linear infrared data to the power of the gain, or gamma, becomes a multiplication of the gain by the log infrared data.

As a further refinement, the gain may be adjusted separately for different spatial frequency bands. This overcomes some of the limitations in real lenses and CCD sensors that receive an infrared image with less focus and sharpness than a visible image. For more effective nulling of defects, the computer is programmed to find a higher gain matching the infrared record at higher frequencies to overcome this limit in real lenses and sensors. Without this different correction for spatial frequency, an effect is seen similar to that produced by an unsharp mask in which the details of a defect are attenuated less than the overall defect. Further, it has been found that the degree of correction required tends to vary between scans as the focus errors in the lens interact with film warpage. Hence, nulling must be performed on each specific image, and even on specific areas in an image, rather than as a rote sharpening of the entire infrared image.

A cross correlation or autocorrelation effectively averages the power of all frequencies; however, if the mean has a non-zero magnitude, this zero frequency mean, or "DC" term, usually predominates. Because the mean is not part of the signal of interest in this process, the cross correlations and autocorrelations would give false indications. The division of the visible and infrared images into frequency bands has an advantage in that each band has zero mean, solving the potential problem of the zero frequency mean with the autocorrelation and cross correlation. However, even without a nonzero mean, it is still possible for widely different frequencies to beat together in the cross correlation and autocorrelation terms similar to heterodynes in radio theory. Use of discrete frequency bands has the additional advantage of preventing widely different frequencies from combining in this way. Frequency bands also allow the use of the logarithmic domain to simplify the application of a gain and the division of visible pixel data by infrared pixel data as a subtraction while still allowing the cross correlations and autocorrelations to be performed with zero mean.

In another embodiment, gain is adjusted separately for different spatial regions of the image. This has been found to overcome a number of limitations in real scanners that illuminate and focus the edges of a film differently than the center. Further, use of spatial regions overcomes problems with different kinds of defects exhibiting slightly different attenuation characteristics between visible and infrared light, often because of a misalignment between the scanner's visible and infrared illumination systems. The region over which the gain is allowed to vary is called the "smudging" region.

The computer is programmed to calculate nulling gain in one of several ways. In one embodiment, the computer generates a measure of "likeness" over a smudging region by measuring the cross correlation between a candidate restored image and the defect image. The cross correlation is the product of the image and defect, pixel by pixel, called the point cross correlation, averaged over the smudging region. If the cross correlation is zero, then that defect has been nulled. If the smudging region is too small, the process might null out a portion of the image that looks like the defect along with the defect; however, if the smudging region is large enough, the chance of image detail looking holographically like the defect is remote, and the image is preserved as the defect is nulled.

In another embodiment, the nulling gain is calculated directly using the cross correlation between the uncorrected visible image divided by the autocorrelation of the infrared image. First, the cross correlation is averaged over the smudging region. Then the autocorrelation, which is the square of the value of each pixel (called the point autocorrelation), is averaged over the smudging region. The average cross correlation is divided by the average autocorrelation to produce an autocorrelation gain for the region. When this autocorrelation gain is applied to the infrared image and canceled from the visible, a corrected image is formed that gives a zero cross correlation with the infrared image.

The process of the preferred embodiment will now be summarized. First, both linear visible and infrared scans of the image are taken in a conventional manner as described in U.S. Pat. No. 5,266,805. Pixel data from both scans are converted into logarithmic form, and then each of these logarithmic images are split into frequency bands. For every corresponding frequency band, the pixel by pixel cross correlation between the visible and infrared records is calculated as is the autocorrelation of the infrared pixel data Next, the pixel by pixel cross correlations and autocorrelations are averaged, or "smudged," over small regions. For each region, the smudged cross correlation is divided by the smudged autocorrelation to find the nulling gain. The log of the infrared bandpass data is then multiplied by the nulling gain, and the product is subtracted from the logarithmic visible image data to obtain the corrected image data for that bandpass. After this operation has been performed on all regions of the image and all bandpasses, the corrected bandpasses are reassembled to obtain the logarithmic data for the corrected image. The corrected image may then be displayed, stored, or transmitted after the antilog of the data is calculated.

Figure 2:
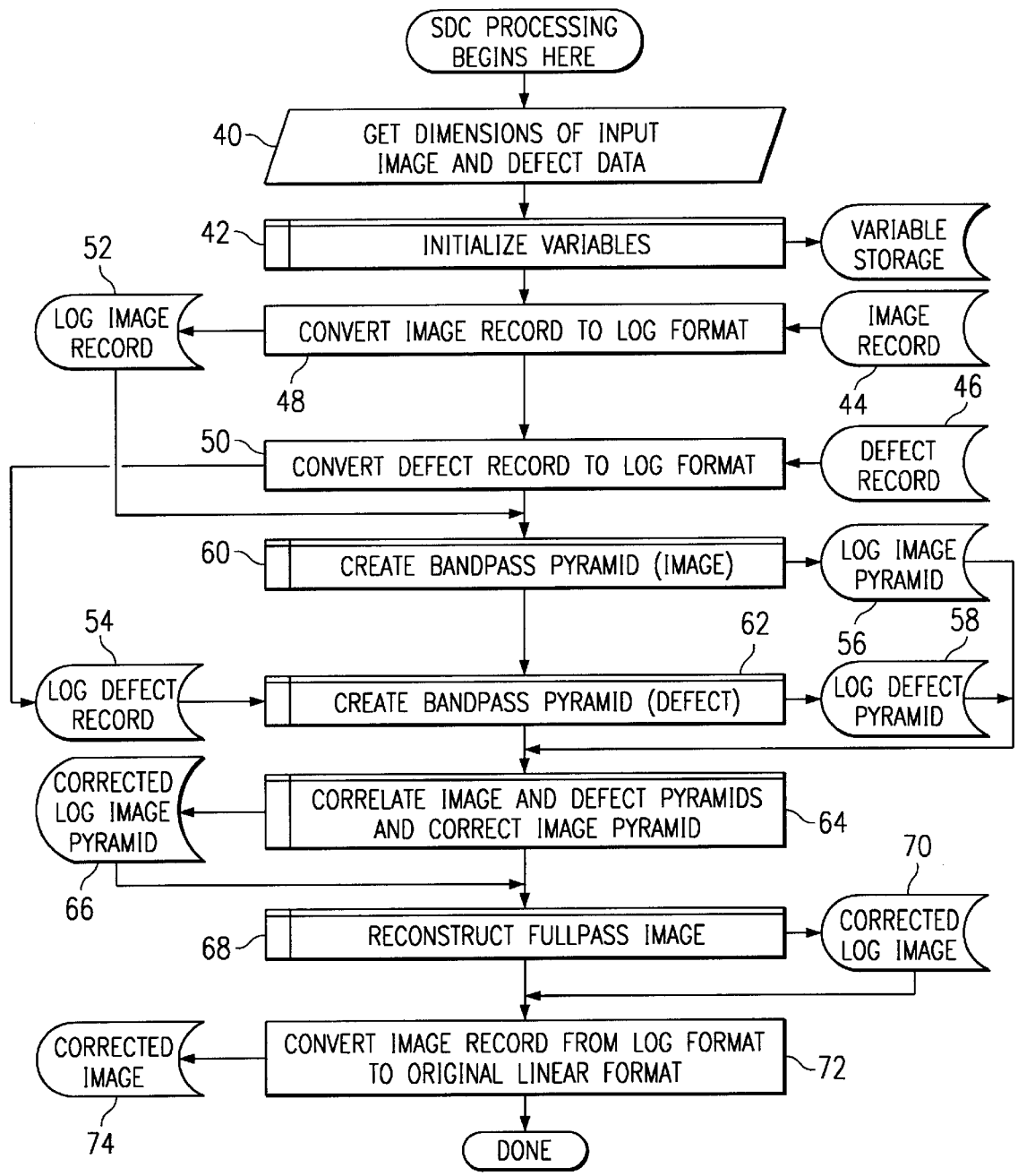
FIG. 2 is a flow diagram indicating the overall processing sequence for defect channel nulling.

Referring now to FIG. 2, a generalized description of the overall process of defect channel nulling is provided to facilitate its understanding. At the beginning of the process, the dimensions of the input image and defect data are ascertained at step 40, and program variables are initialized at step 42. Both the image record 44 and defect record 46 are converted into a logarithmic form by steps 48 and 50, respectively. From the log image record 52 and log defect record 54, the log image bandpass pyramid 56 and log defect bandpass pyramid 58 are created by steps 60 and 62, respectively. Layers of the image and defect bandpass pyramids 56 and 58 are then correlated by step 64 to create a corrected log image pyramid 66. Based upon the correlation, the image pyramid 66 is corrected and reconstructed at step 68 to a fullpass image 70. Finally, the corrected log image 70 is converted by step 72 from the logarithmic format 70 to a corrected linear format 74. Each of these high level steps will now be described in detail below.

Figure 3:
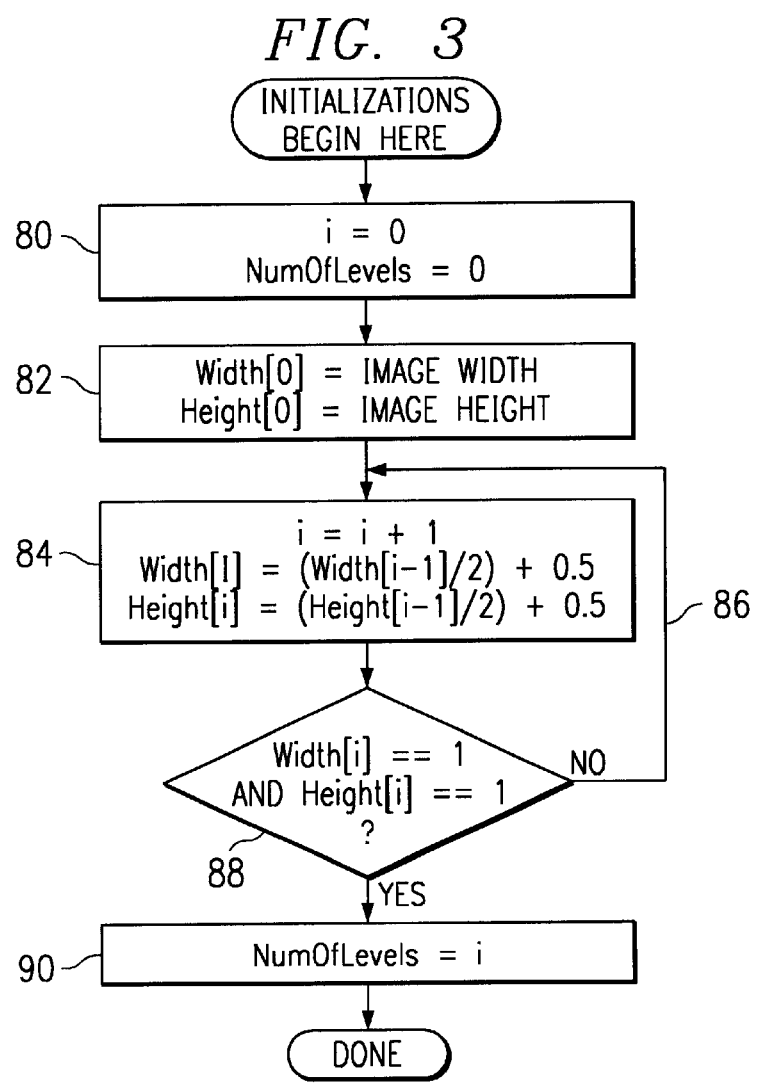
FIG. 3 is a flow diagram indicating the sequence of variable initialization.

FIG. 3 is the first of the diagrams which detail the processes more generally outlined in FIG. 2. FIG. 3 provides a detailed description of the variable initialization of the pyramids mentioned in FIG. 2 to begin the overall defect channel nulling process of the present invention. First, the sequence of the array is set at 0 by step 80 to begin the counting process. Next, the image width and height are defined by step 82. As the levels of the array are increased, the width and height of the image are calculated as a function of the levels in the array at step 84. This process is repeated as long as the width and height of the current level are not both equal to one as checked by condition 86. When the width and height of the image are both equivalent to one at decision step 88 thereby indicating a pyramid level consisting of a single pixel, the counting of the number of levels is completed and is set by step 90. With this step, variable initialization is complete.

In one embodiment, the next step is to convert the image and defect records into logarithmic format Converting to a log format is desirable because of the pyramid building process which facilitates splitting the images into frequency bands. Each layer of the pyramid represents a frequency band. Using the pyramid process allows a zero expected value, or mean, at each level and therefore eliminates the bias or "DC" term described earlier that differentiates a covariance and correlation. Because a zero mean can be reached, a linear format which could possibly result in a division of zero by zero (if the visible record is differentiated from the defect record by a division) cannot be used. Converting to a logarithmic scale solves this problem because division of the image record by the defect record is effected by a simple subtraction between equivalent levels of the image and defect pyramids. Thus, use of the log domain combined with the pyramid process solves problems both with DC bias in the correlation calculations and with effective division on separate frequency bands.

When using the disclosed method to null out defects, it is helpful to be able to measure how the spatial frequency response of the defects in one record compares to the response in another record. One way to do this is to perform a fast Fourier transform on each record and compare them. Based on the comparison, the attenuated frequencies of one record can be boosted to match the other. Another expedient is to perform two-dimensional cross correlation and autocorrelation calculations. By spatially dividing one by the other, relative blurring in the image may be found and corrected. In a preferred embodiment, each image is divided into frequency bands. By performing the nulling process on each frequency band separately, any variations in frequency response between the images will be automatically compensated thereby boosting any attenuated frequencies.

One way of dividing the frequency into frequency bands that allows the original image to be reassembled is to create a band pass pyramid. In a bandpass pyramid, the image is first low pass filtered and then subsampled at a lower resolution. The lower resolution is then upsampled to the original resolution in order to produce an image devoid of details that could not be represented by the lower sampling frequencies but which contains all the details that could be represented by the lower frequencies. When this upsampled image is subtracted from the original image, only the high frequency details remain. The entire process is repeated on the subsampled image just discussed and the process is continued recursively to generate successively lower and lower frequency bands. Each band represents only those details that could not be represented by the lower frequency band. Because of the way that each of these bands is generated, if the lowest frequency band is upsized and added to the band above and the procedure is repeated recursively until the highest band is reached then the original image will be precisely reconstructed. Possible variations in this process include the way in which an image is downsized or upsized. If a poor algorithm is used, there will be aliases in the bandpasses. These aliases will cancel each other out as long as nothing is done to each band; however, if the different bands are processed with different gains, the aliases will affect the final reconstructed image. Thus, the upsize and downsize chosen in a preferred embodiment are a compromise between minimizing aliases and conducting fast computations. Other downsizes and upsizes which are possible include the bicubic process used in Photoshop manufactured by Adobe Corp.

Figure 4:
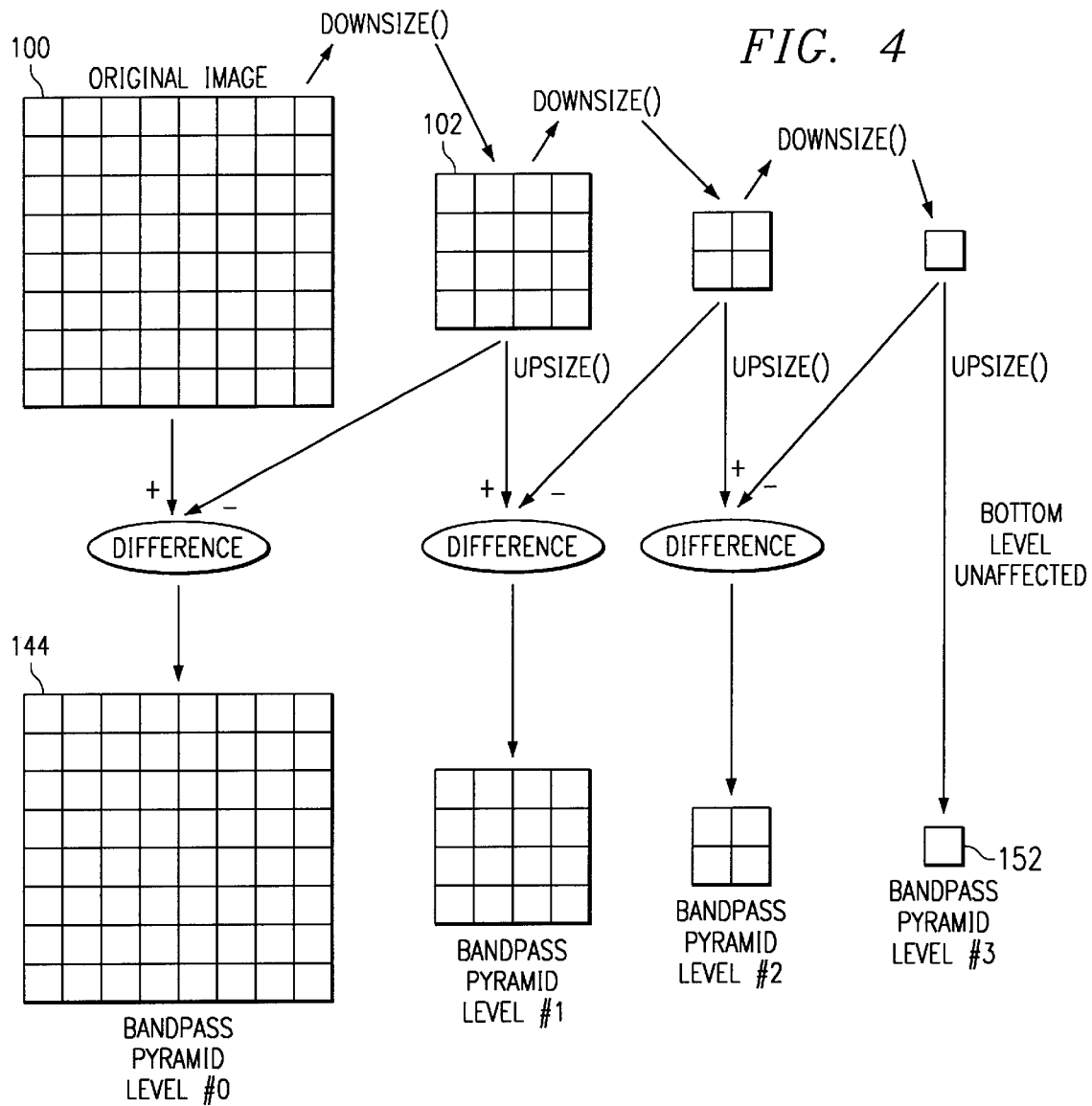
FIG. 4 is a flow diagram of the pyramid building process.
Figure 5A:
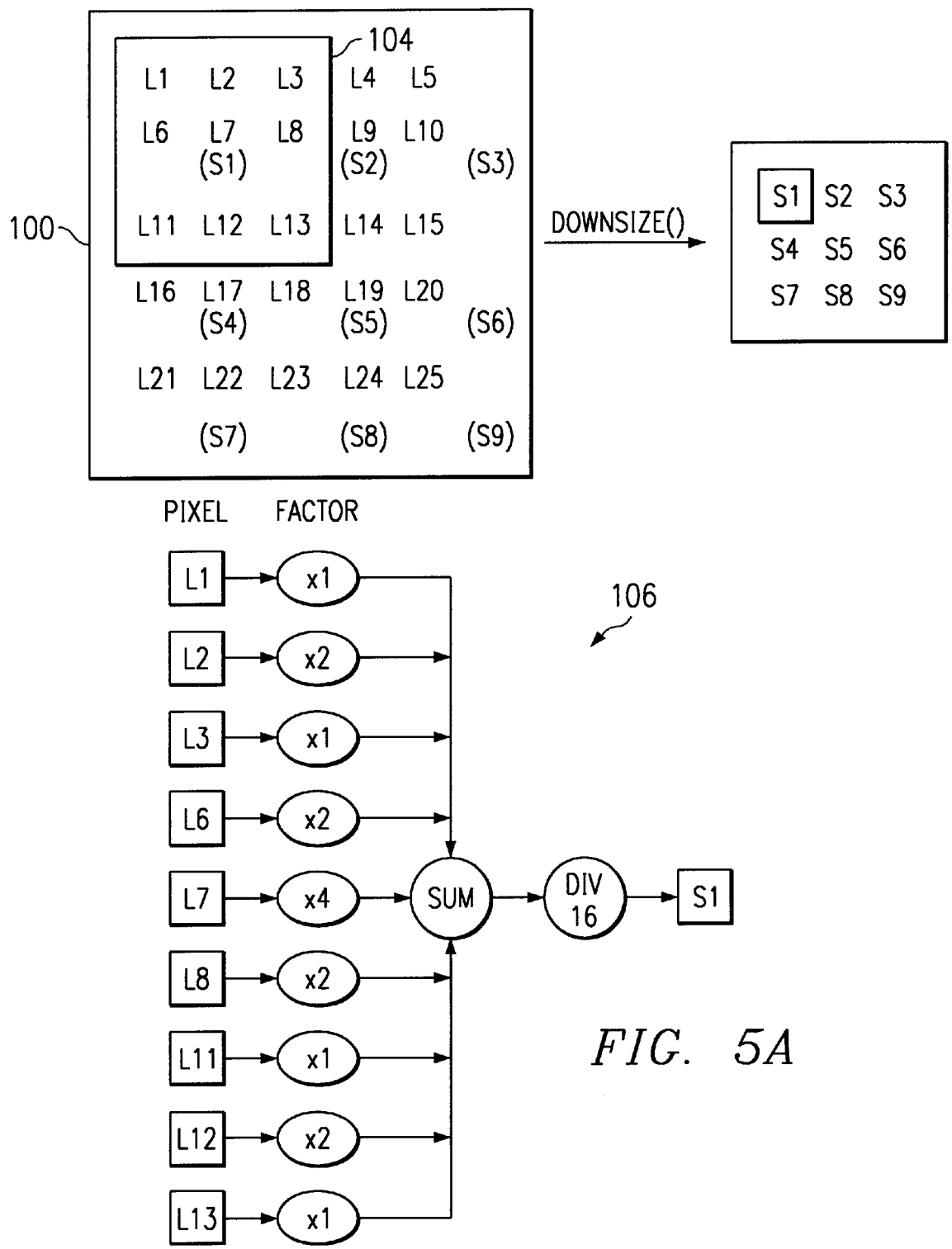
FIGS. 5A, 5B, 5C and 5D are diagrams which illustrate the process of pyramid downsizing.

FIG. 4 describes the pyramid building process in greater detail. Typically, a 2,000×3,000 original pixel image is used and is downsized by one-half at each level. For illustrative purposes, an original 8×8 image 100 is used. In the first step, the image 100 is downsized to a 4×4 image 102. FIGS. 5A through 5D provide a detailed description of the process of downsizing. They show how a 3×3 region 104 at one level of the original 8×8 image 100 is downsized to a single pixel 51 at the next level. Each pixel in the 3×3 region 104 is multiplied by a factor which is based upon the pixel's position within the 3×3 region 104. In FIG. 5A, the pixel with designation L1 is given a factor of one, pixel L2 is given a factor of two, L3 has a factor of one, L6 has a factor of two, L7 has a factor of four, L8 has a factor of two, L11 has a factor of one, L12 has a factor of two and L13 has a factor of one. Each pixel and its corresponding factor are shown in diagram 106. These factors are chosen so that the resulting single pixel is a weighted average of the pixels in the other level based on the proximity of the source level pixels closest to the resulting pixel. Next, the sum of the product of pixel values and factors is taken and divided by sixteen, which is the sum of the factors so that the value for the resulting pixel is anti-aliased. The value after the division is the value of pixel S1 which is the downsized representation of the original 3×3 region 104. Use of the factors followed by the subsequent division by the sum of the factors permits each pixel in the upsized level to contribute a weighted portion to the value of the pixel being calculated in the downsized level based on the upsized pixel's proximity to the downsized pixel.

Figure 5B:
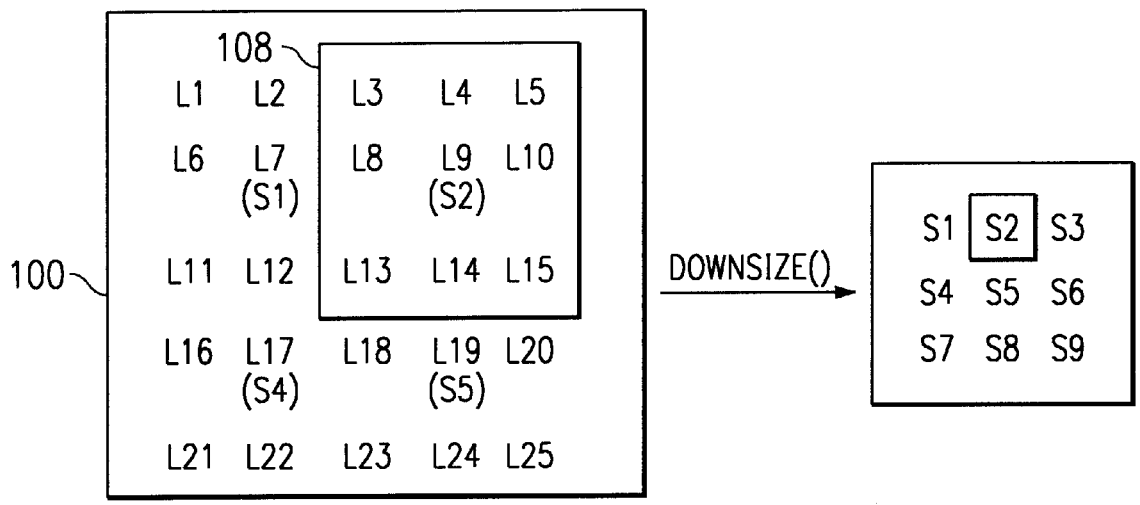
Figure 5B:
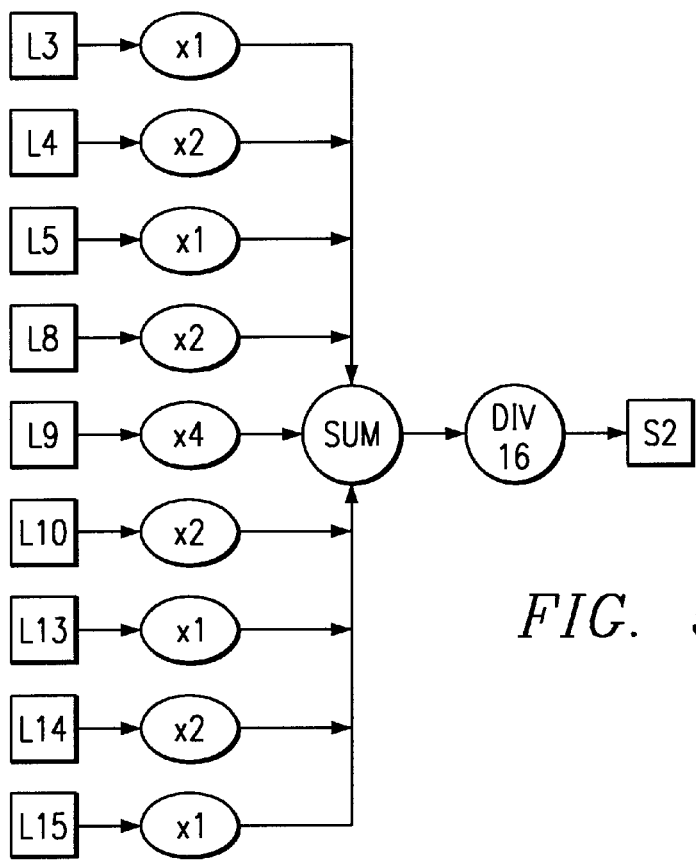
Figure 5C:
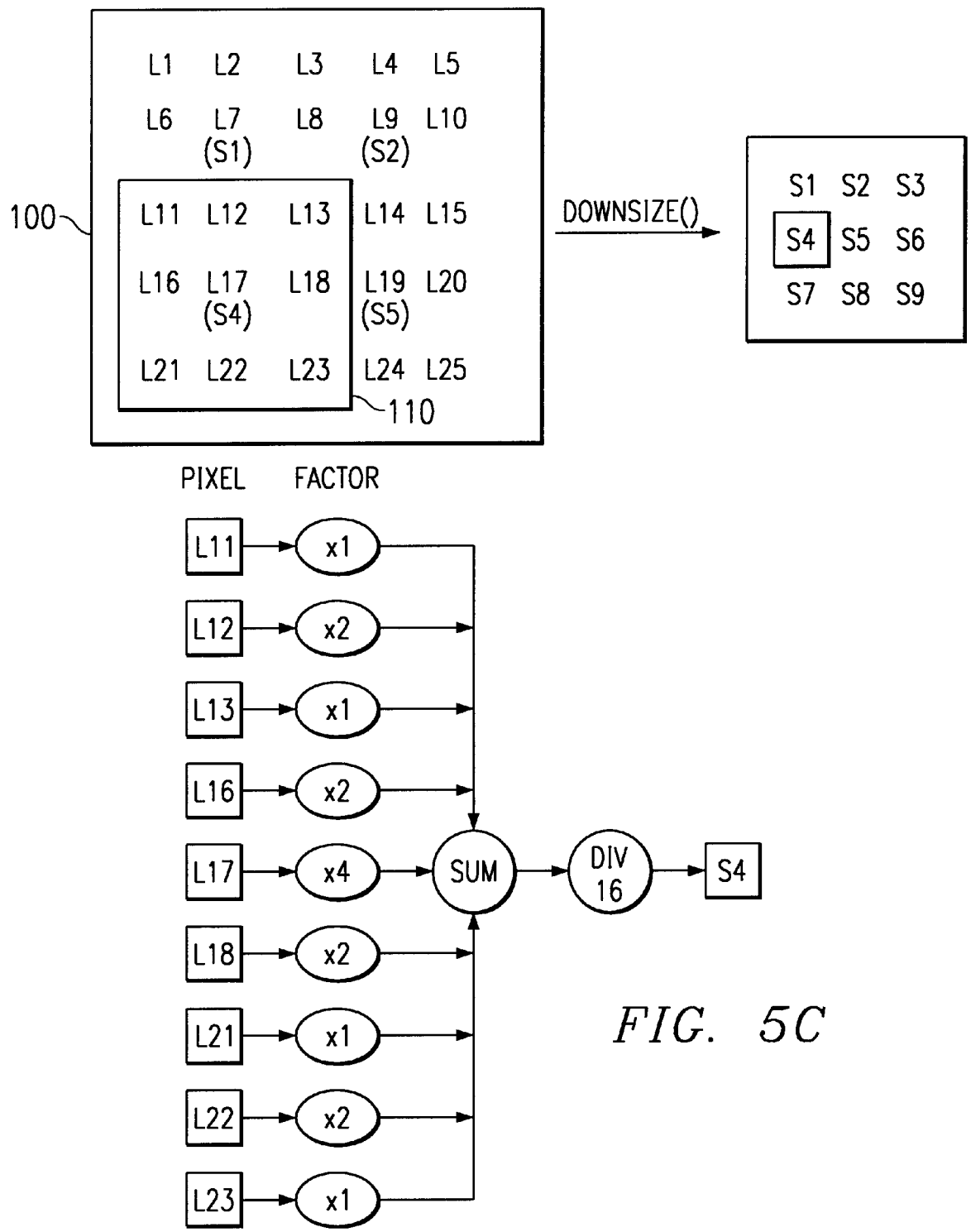
Figure 5D:
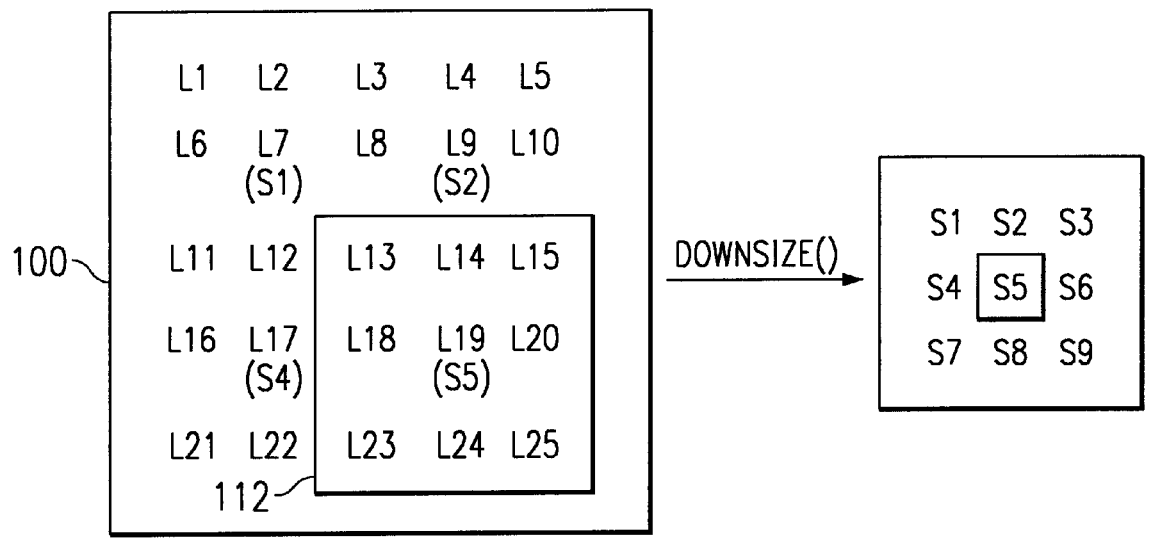
Figure 5D:
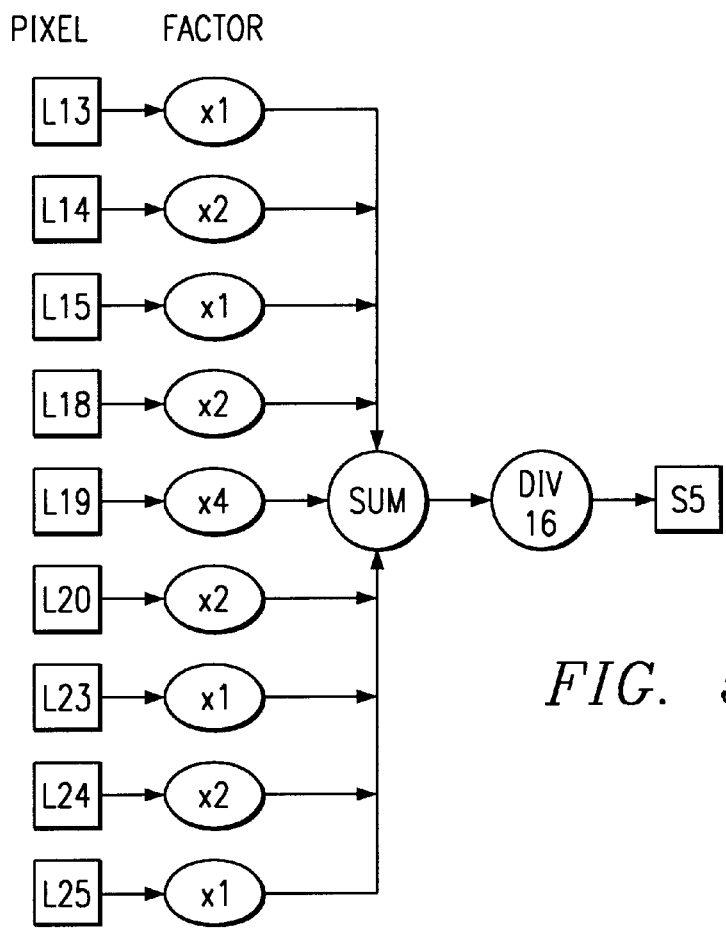

The remaining diagrams in FIGS. 5B through 5D are examples of the above described process over different areas of the original 8×8 image 100. FIG. 5B illustrates the same 8×8 area 100 with a different 3×3 region 108 within the 8×8 area 100 being sampled. As in FIG. 5A, the pixels of FIG. 5B are multiplied by a factor based on each pixels respective position in the 3×3 region 108. The pixel with designation L3 has a factor of one, L4 has a factor of two, L5 has a factor of one, L8 has a factor of two, L9 has a factor of four, L10 has a factor of two, L13 has a factor of one, L14 has a factor of two, and L15 has a factor of one. Again, the sum of the pixel-factor products is taken and divided by sixteen, the sum of the factors. The value after the division is the value of pixel S2 which is the downsized representation of the 3×3 area 108. FIG. 5C illustrates the same 8×8 area 100 of FIGS. 5A and 5B with a different 3×3 region 110 being sampled.

As in FIGS. 5A and 5B, the pixels of FIG. 5C are multiplied by a factor based on each pixel's position in the 3×3 region 110. The pixel with designation L11 has a factor of one, L12 has a factor of two, L13 has a factor of one, L16 has a factor of two, L17 has a factor of four, L18 has a factor of two, L21 has a factor of one, L22 has a factor of two, and L23 has a factor of one. The sum of the pixel values is taken and divided by sixteen which is the sum of the factors. The value after the division is the value of pixel S4 which is the downsized representation of the 3×3 area 110. FIG. 5D illustrates the same process with a different 3×3 region 112 of the 8×8 area 100 being sampled. The value after the factor multiplication, summation and division calculations is the value of pixel S5 which is the downsized representation of the 3×3 area.

Figure 6:
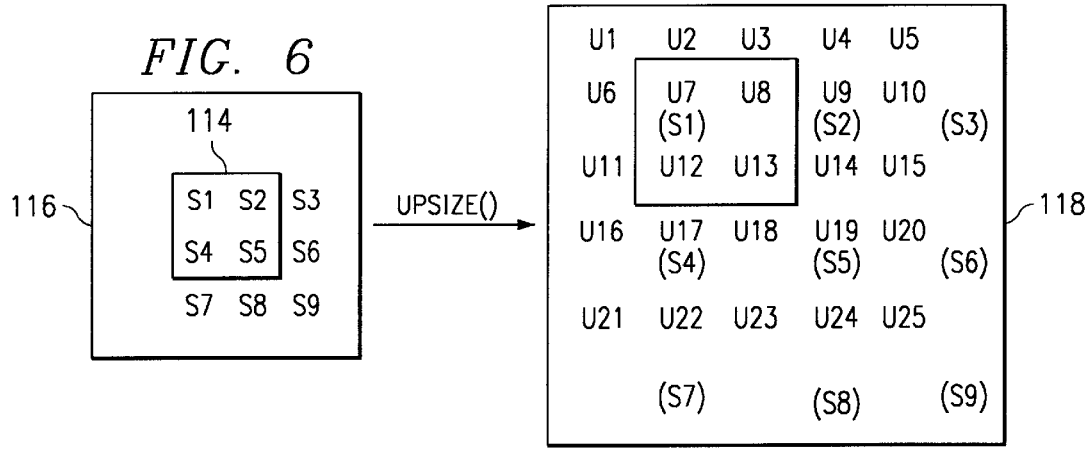
FIG. 6 is a diagram which illustrates the process of pyramid upsizing.

Returning to FIG. 4, the new downsized image 102 is then upsized to create an upsized image. FIG. 6 illustrates a region of a 4×4 area being upsized to an 8×8 area 118. There are several ways to upsize including using a sinc function (sin x divided by x). However, the algorithm chosen for this invention addresses the calculation of a higher resolution pixel by looking at the pixels in the downsized image lying in four directions from the higher resolution pixel. This algorithm also has the advantage of being more expedient in that it is much faster to compute than a sinc function.

The pyramid levels may be conceptually considered to lay over each other. Each covers the same image, but a lower level covers it with pixels more sparsely. Pixels in a specific level have pixels both over and under them in higher and lower levels. In addition, as seen in FIGS. 7A through 7D, pixels also have pixels to the left, to the right, to the top, and to the bottom in the same and in different levels. As used herein, "over and under" will refer to the relation between different levels while "to the top" and "to the bottom" will refer to a spatial relationship within the same image level. In the case where the value for the pixel to be calculated at a higher resolution has a pixel directly under it at a lower resolution, the lower resolution pixel is simply copied to give the higher resolution pixel. A different situation occurs when the higher resolution pixel being calculated has lower resolution pixels under it located to the right and to the left in the lower resolution level but not directly under the higher resolution. In this latter case, the algorithm averages the two pixels of the lower level which lie to the right and left under the high resolution pixel. A third situation arises when the higher resolution pixel to be calculated has lower resolution pixels under it; i.e., to the top and to the bottom in the lower resolution level, but not directly under it. In this case, the algorithm averages the two lower resolution pixels to give the higher resolution pixel. A fourth scenario is where the higher resolution pixel being calculated does not have any pixels under it, whether to the right, to the left, to the top or to the bottom, or directly under it. Here, the higher resolution pixel is directly in between the lower resolution pixels and the algorithm takes an average of four pixels.

Figure 7A:
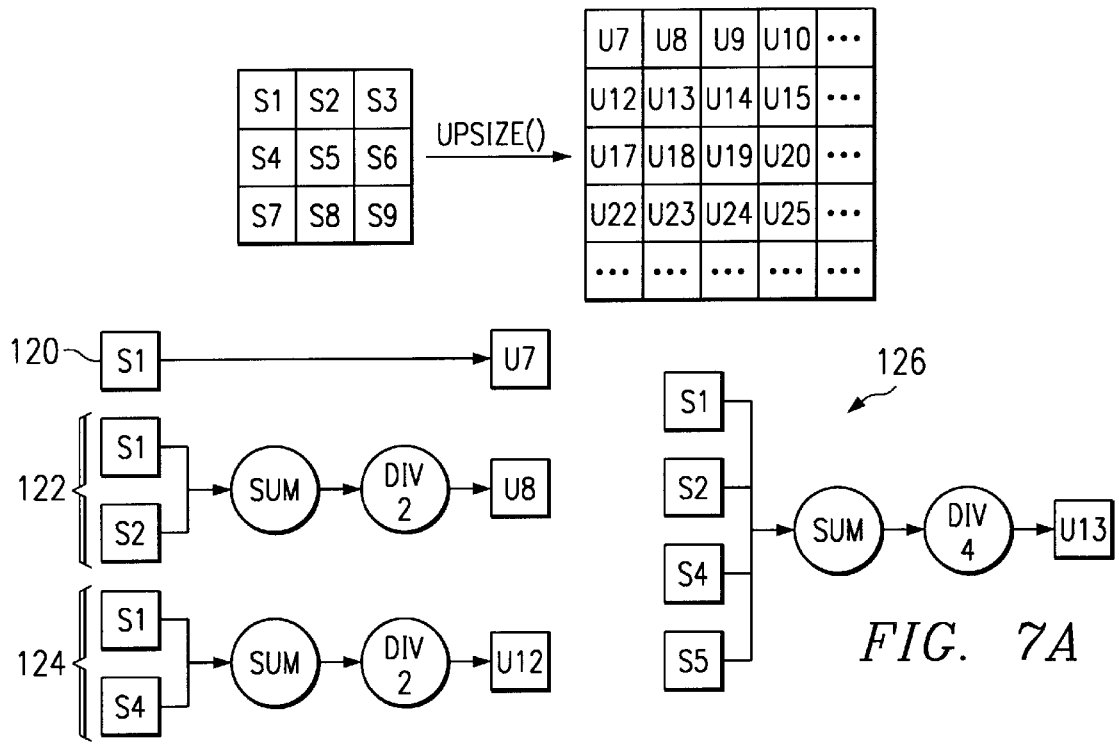
Figure 7B:
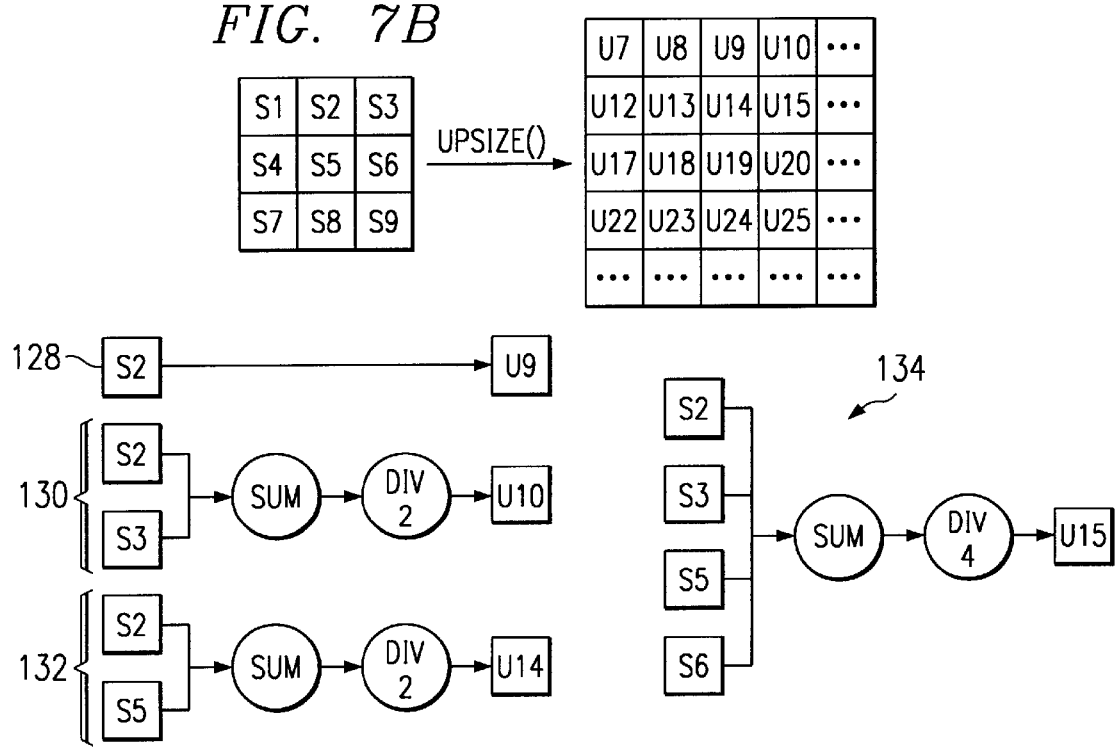
Figure 7D:
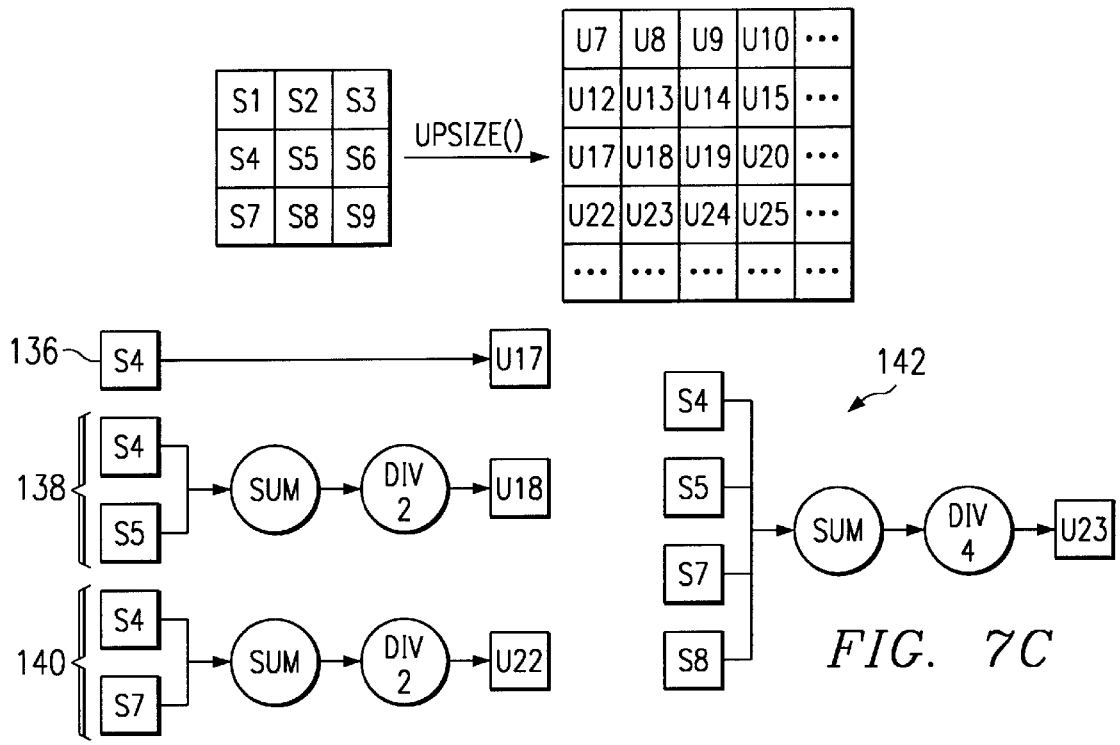
Figure 7D:
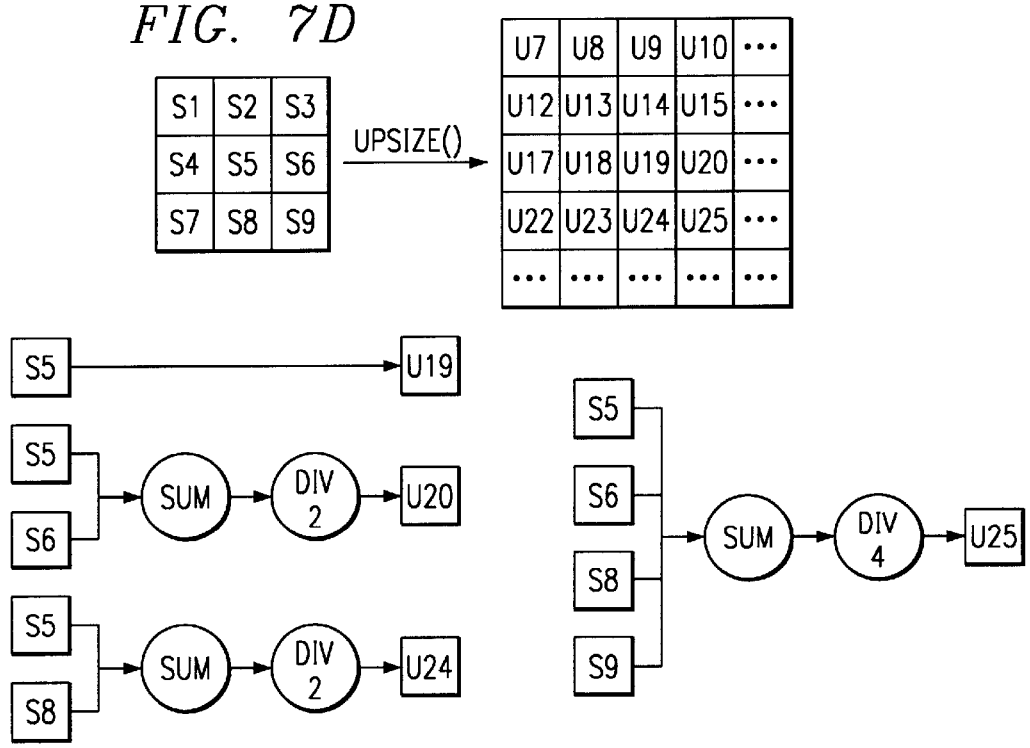

FIGS. 7A through 7D describe upsizing in general and illustrate the four cases just described. FIG. 7A focuses on Pixel S1. Pixel S1 is directly upsized to position U7 at 120 by copying the data in S1 to U7. Pixels S1 and S2 are summed and divided by two to give value U8 equal to the average of S1 and S2 at 122. Similarly, pixels S1 and S4 are summed and divided by two to give value U12 at 124. Pixels S1, S2, S4, and S5 are summed and divided by four to give the resulting average to pixel value U13 at 126. In FIG. 7B, the upsizing is focused on pixel S2. Pixel S2 is upsized directly to position U9 at 128. Pixels S2 and S3 are summed and divided by two to give value U10 at 130. Pixels S2 and S5 are summed and divided by two to give value U14 at 132. Pixels S2, S3, S5, and S6 are summed and divided by four to give pixel value U15 at 134. In FIG. 7C, the upsizing is focused on pixel S4. Pixel S4 is upsized directly to position U17 at 136. Pixels S4 and S5 are summed and divided by two to give value U18 at 138. Pixels S4 and S7 are summed and divided by two to give value U22 at 140. Pixels S4, S5, S7, and S8 are summed and divided by four to give pixel value U23 at 142. In FIG. 7D, the upsizing is focused on pixel S5 and upsizes to a different region. Values for U19, U20, U24 and U25 are calculated exactly as described above in connection with FIG. 7C.

Figure 8:
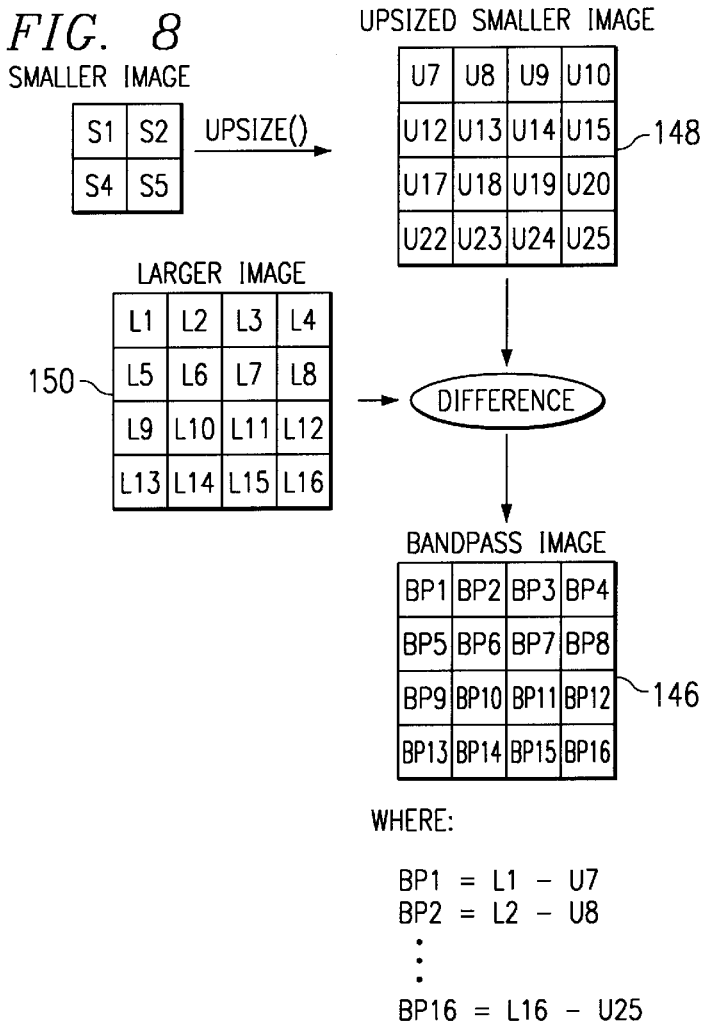
FIG. 8 is a diagram depicting the process of differencing image-related signals.

Referring back to FIG. 4, the new upsized image (not shown), which came from downsized image 102 is now differenced from the original image 100 to give the top octave bandpass image 144. FIG. 8 illustrates in detail the differencing process. Each element of the upsized smaller image 148 is subtracted from the corresponding pixel of the larger image 150 to produce an element in bandpass image 146. For example, BP1 equals L1 minus U7, and BP2 equals L2 minus U8. As shown in FIG. 4, this process is repeated recursively such that each bandpass image represents a specific frequency band of the original image 100. The lowest level of the pyramid is a single pixel 152 which is not bandpassed because there is nothing from which to difference it.

After the original image has been bandpassed, the defect image is also bandpassed using the same pyramid building process as described above. As with the image, each level of the defect pyramid represents a frequency band of the original defect. After the image and defect records are divided into pyramid levels, each defect level is subtracted from the associated image level to recover an image without defects at that level. Prior to subtraction from the corresponding image level, the defect level is multiplied by a gain chosen to match the defect part of the image to provide a better null after subtraction. Preferably, this gain is made a function of position within the defect record so that each element of the defect record can be adjusted with a different gain.

There are many ways of finding this gain. One way is to iteratively try different gains until detail in the subtracted image record does not match detail in the defect record. In other words, the gain is chosen based on which one makes the image record and defect record as uncorrelated as possible. The defect channel nulling of the present invention uses a non-iterative method involving direct calculation to reach an adequate degree of detail uncorrelation. One measurement of the detail matching is the mathematical crosscorrelation in which the two records are multiplied element by element. To the degree both records match, their detail will track each other closely, in either case producing a positive result after the element multiplication. To the extent that they are uncorrelated, the crosscorrelation multiplication will sometimes produce a positive product, but will just as likely produce a negative product. Thus, when the crosscorrelation is averaged over a region, any nonzero value indicates a match or correlation.

Other refinements in gain are based on prior knowledge of record characteristics. For example, in one embodiment, the image record is set to zero whenever the defect rises above a predetermined intensity. Setting the image record to zero when the defect intensity is high is an acknowledgement that beyond a certain point, an accurate prediction based on the image is impossible, and the best estimate is just zero. Although it is possible to set the image record pyramid level to zero whenever the magnitude of the defect record exceeds a threshold, the present embodiment uses instead a refinement that allows a gradual zeroing or blending so that no abrupt drops to zero are created in the image record. Another possible refinement approach includes varying the size of the averaging area based on image and defect characteristics. Thus, the gain refinement used by the present embodiment is given as an example, and is not intended to limit the process to a specific mode of calculating the gain.

Figure 9A:
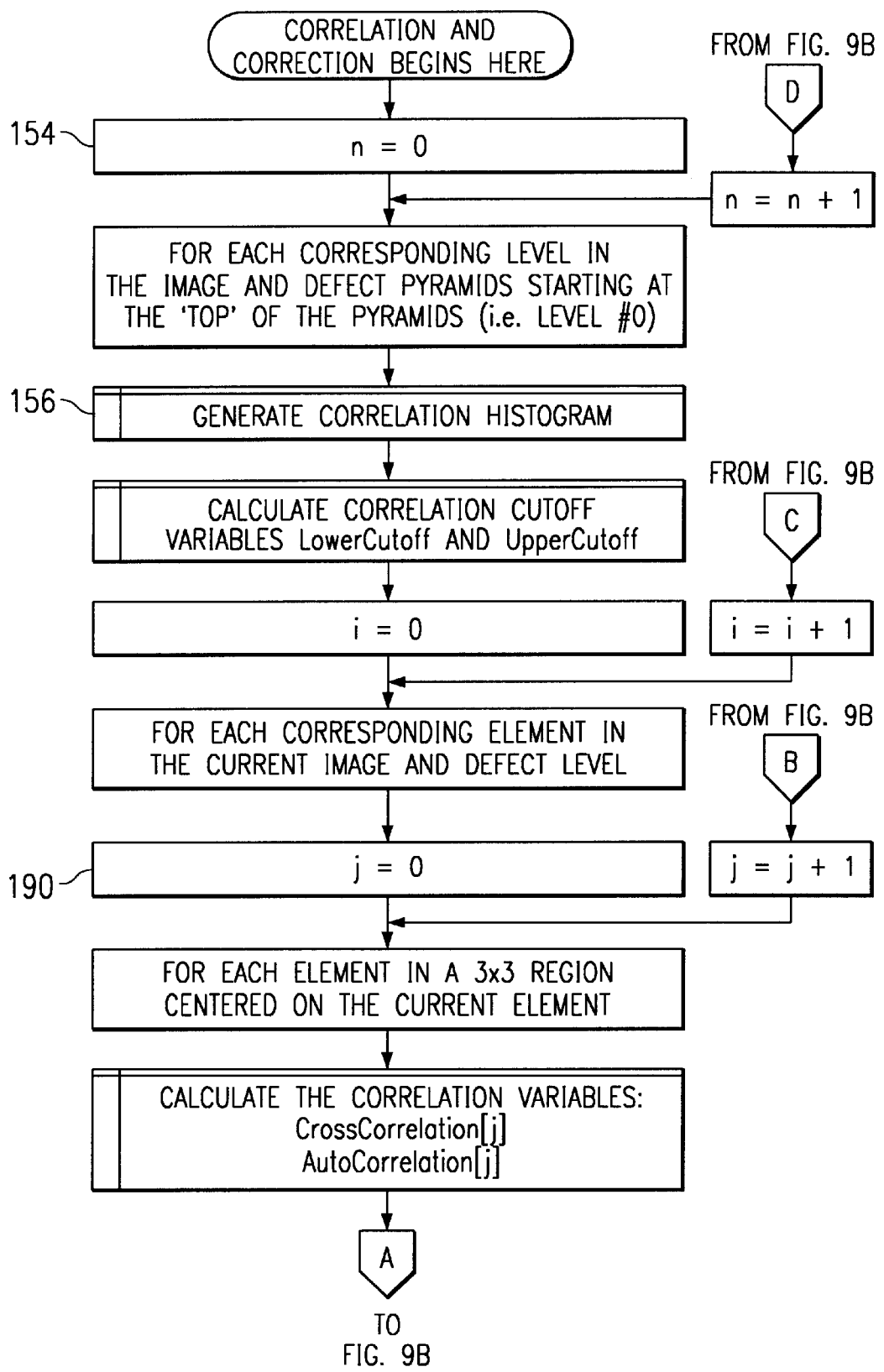
FIGS. 9A and 9B are flow diagrams indicating the steps in the process of correlating the image and defect pyramids.
Figure 9B:
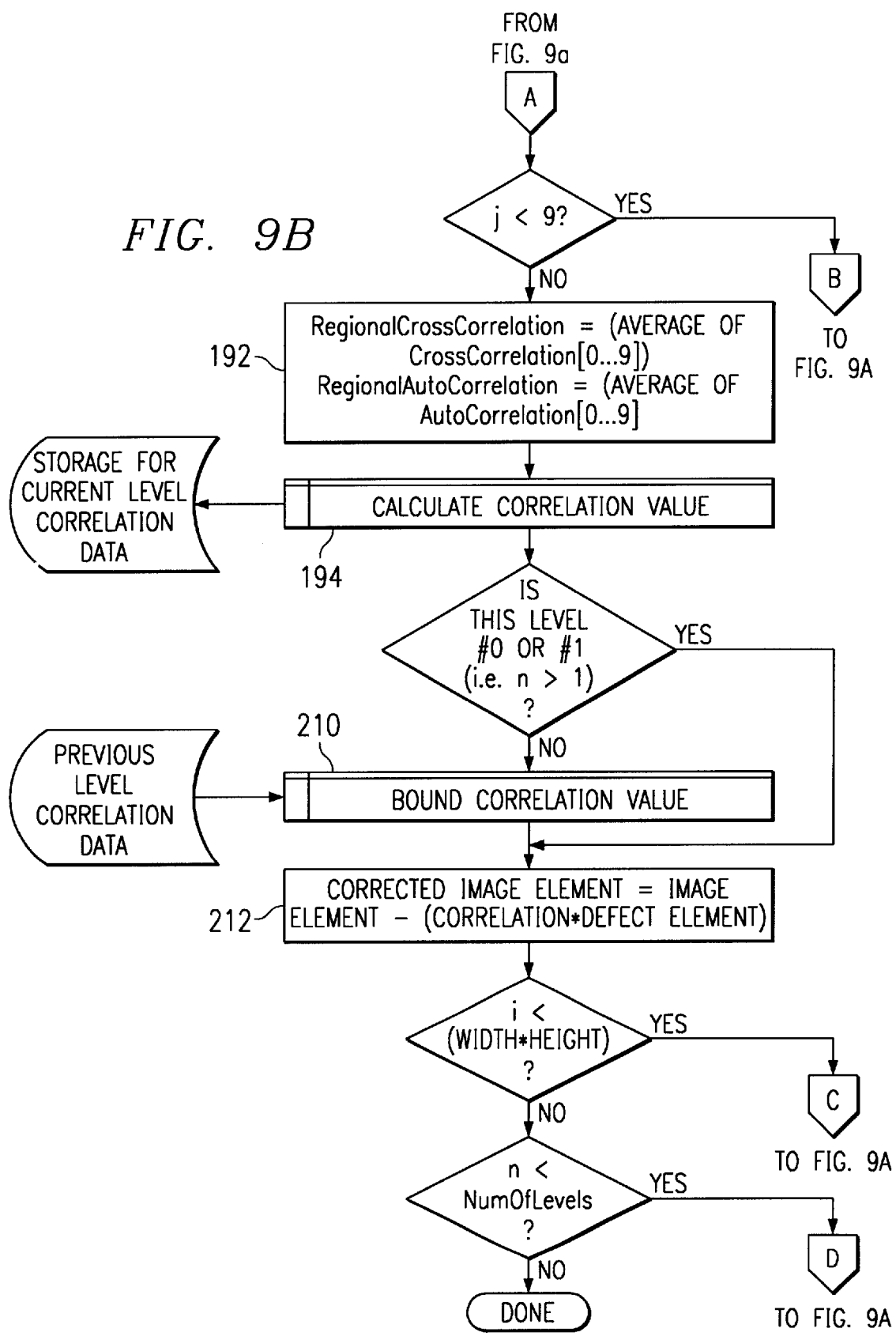
Figure 10A:
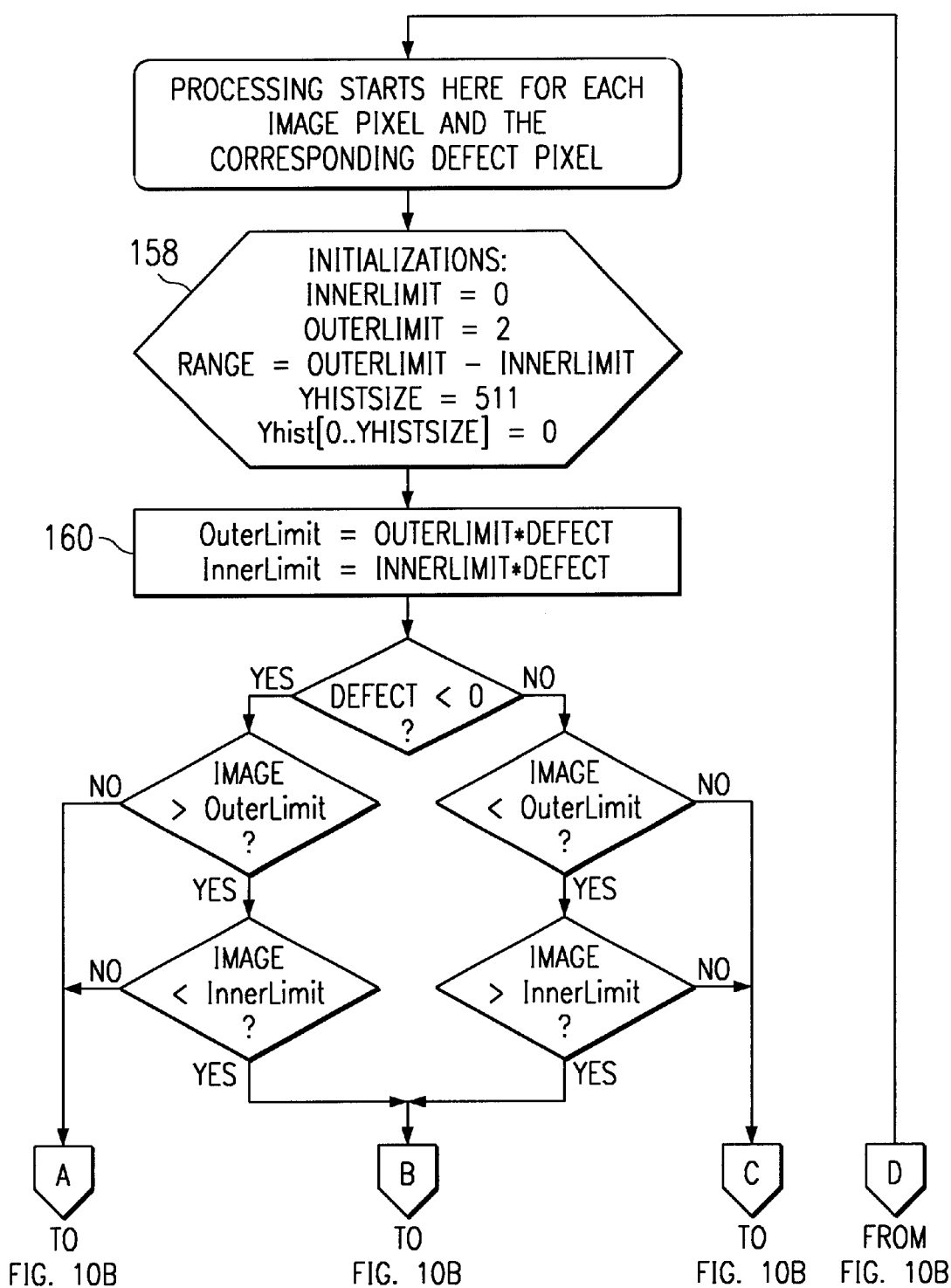
FIGS. 10A and 10B are flow diagrams indicating the steps in the process of correlation histogram generation.
Figure 10B:
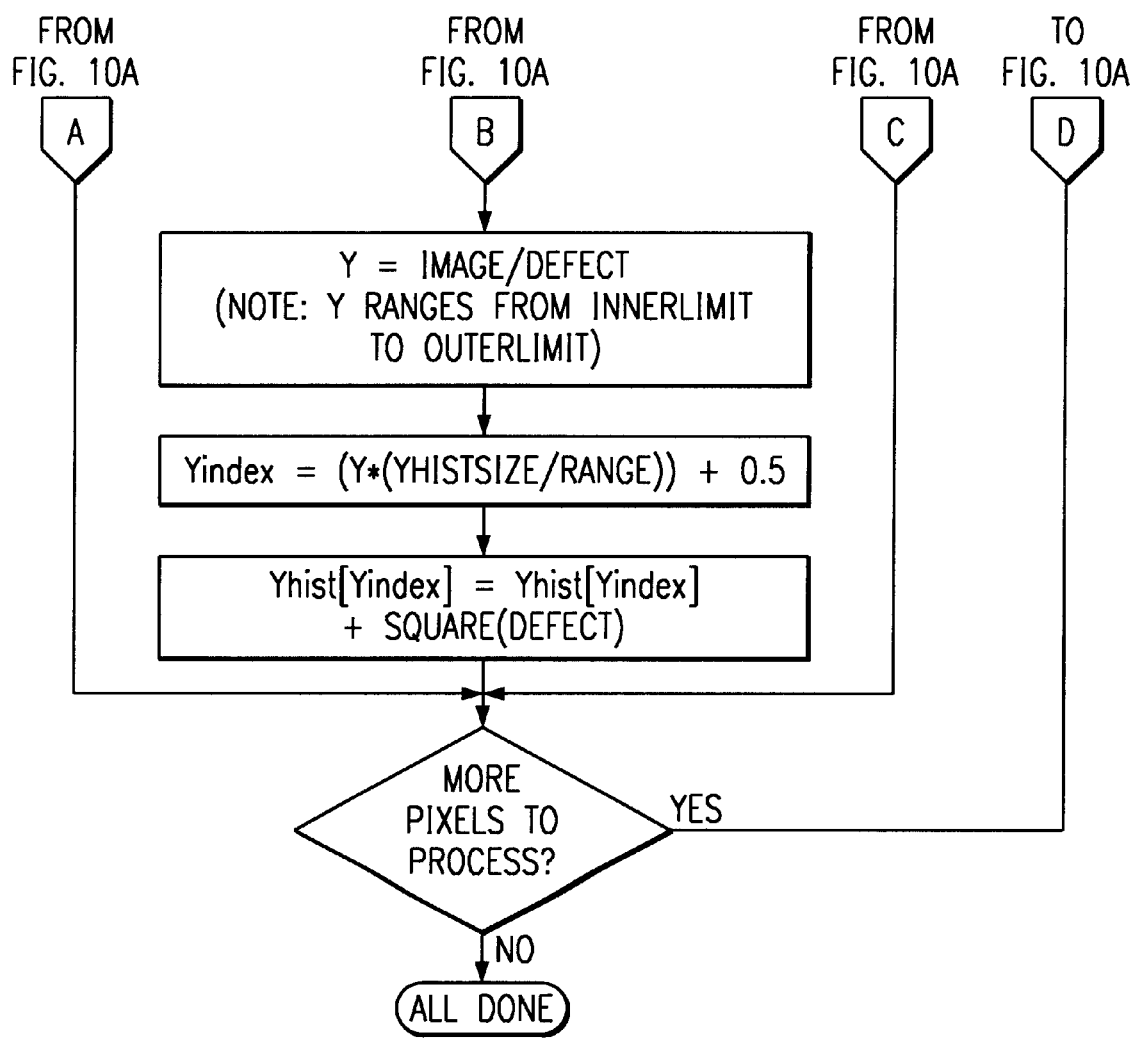

The next step in the defect nulling process is to correlate the bandpass frequency band for both the image and the defect pyramids. An overall description of the correlation process is illustrated in FIGS. 9A and 9B. The correlation process begins with the generation of a correlation histogram at step 156 for each corresponding level in the image and defect pyramids. FIGS. 9A and 9B give a detailed description of how to generate a correlation histogram for a single level of the image and defect pyramids. Processing starts with each image pixel and the corresponding defect pixel at a specified level. First, variables used in the process are initialized at step 158. Specifically, the inner limit for the histogram is set to zero and the outer limit is set to two. These limits are chosen to center around the ideal situation when the correlation equals one. Because the correlation is a squared number, its lowest value is zero, thereby setting the inner limit for the histogram. In order for the approach to be balanced around one, the upper limit is set at two. However, it is understood that other limits could be used.

After the histogram is generated, the next step 160 is to calculate the correlation cutoffs which are the new upper and lower cutoff limits for the histogram.

Figure 11:
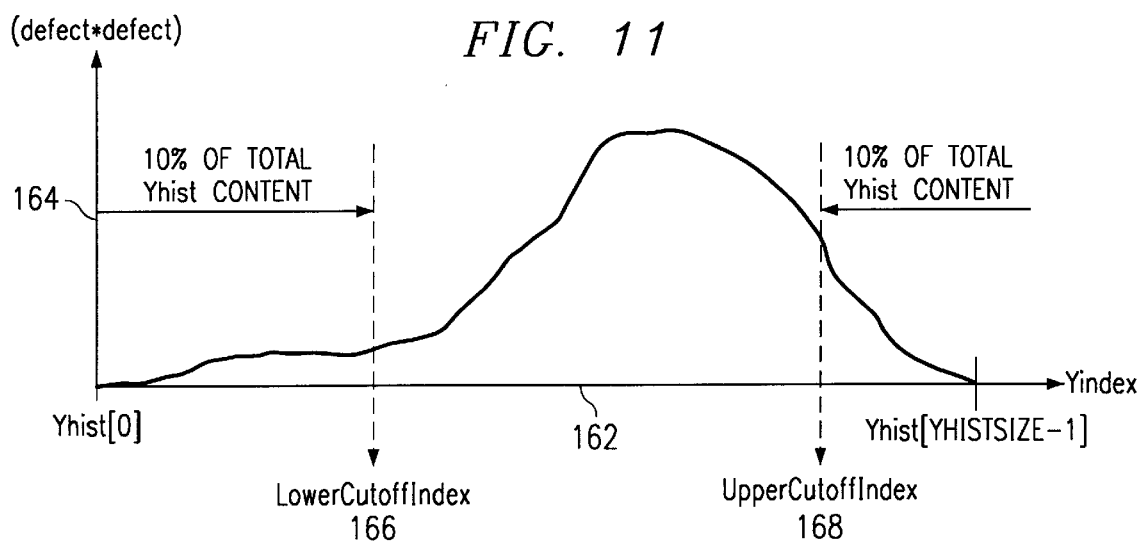
FIG. 11 is a graph of the correlation histogram.
Figure 12A:
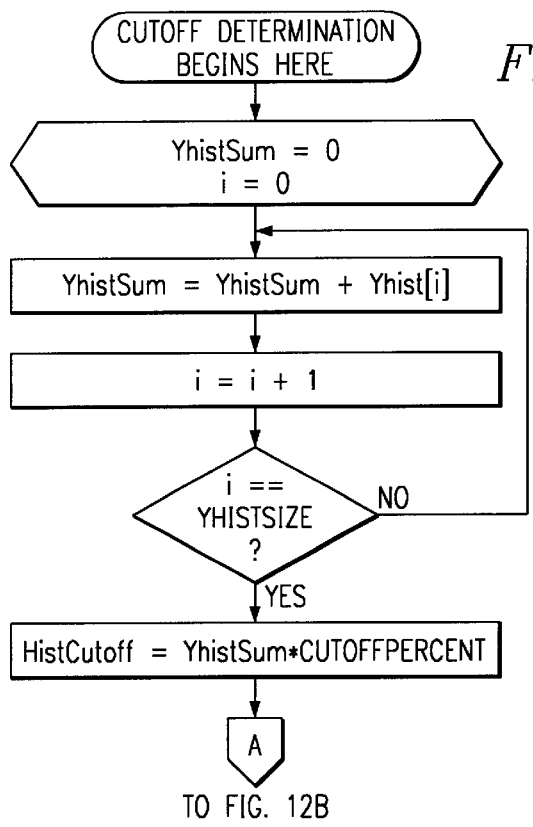
FIGS. 12A and 12B are flow diagrams indicating the steps in the process of calculating the correlation cutoffs.
Figure 12B:
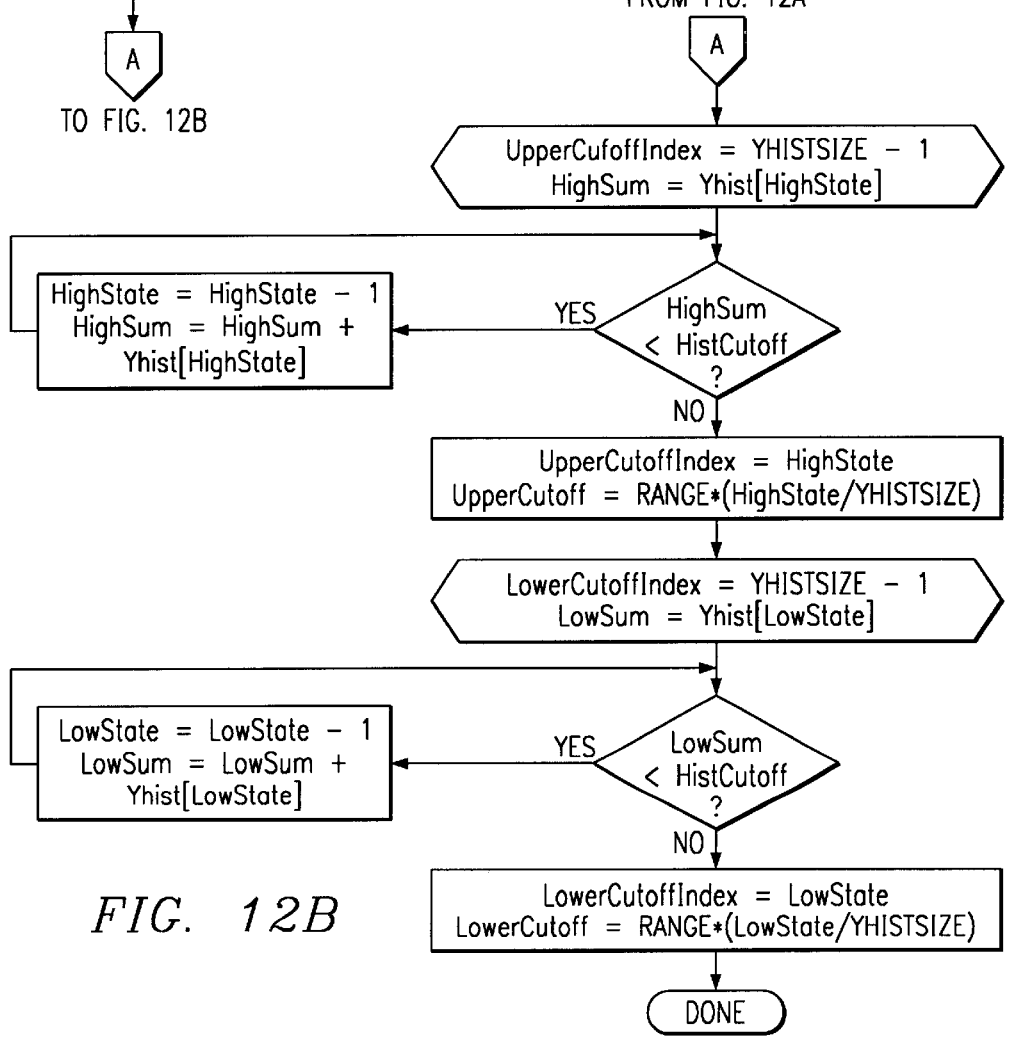

A graph of the histogram with the correlation cutoffs is illustrated in FIG. 11. This figure shows how well the defect record tracks the visible component of a defect. The x-axis 162 is the ratio of the defect record to the visible record when the visible image has a defect. The y-axis 164 is the number of pixels representing that ratio weighted by the square of the pixels. If, for example, the visible defect exactly tracked the defect record, all pixels would show a one to one correspondence. In practice, however, the infrared and visible records do not track exactly, and the graph of FIG. 11 shows the degree to which they diverge. The ten percent points 166 and 168 as illustrated attempt to show the range for which articulation or fine adjustment of defect gain relative to visible is expected to be needed. The process of calculating the correlation cutoffs is described in FIGS. 12A and 12B. These new limits 166 and 168 define the range within which the values will be considered.

Figure 13:
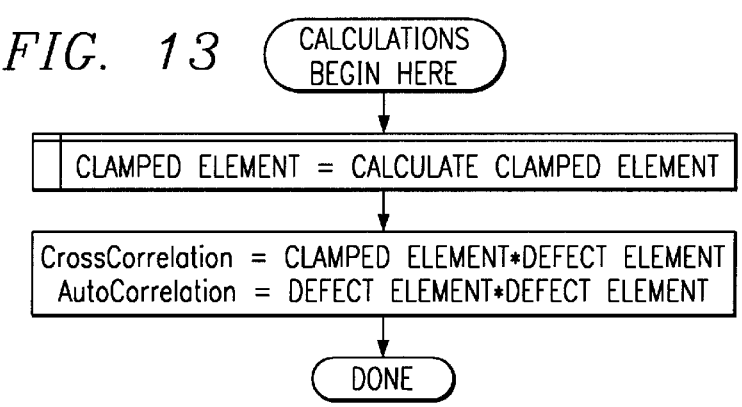
FIG. 13 is a flow diagram detailing the steps in the process of calculating the cross correlation and autocorrelation.
Figure 14:
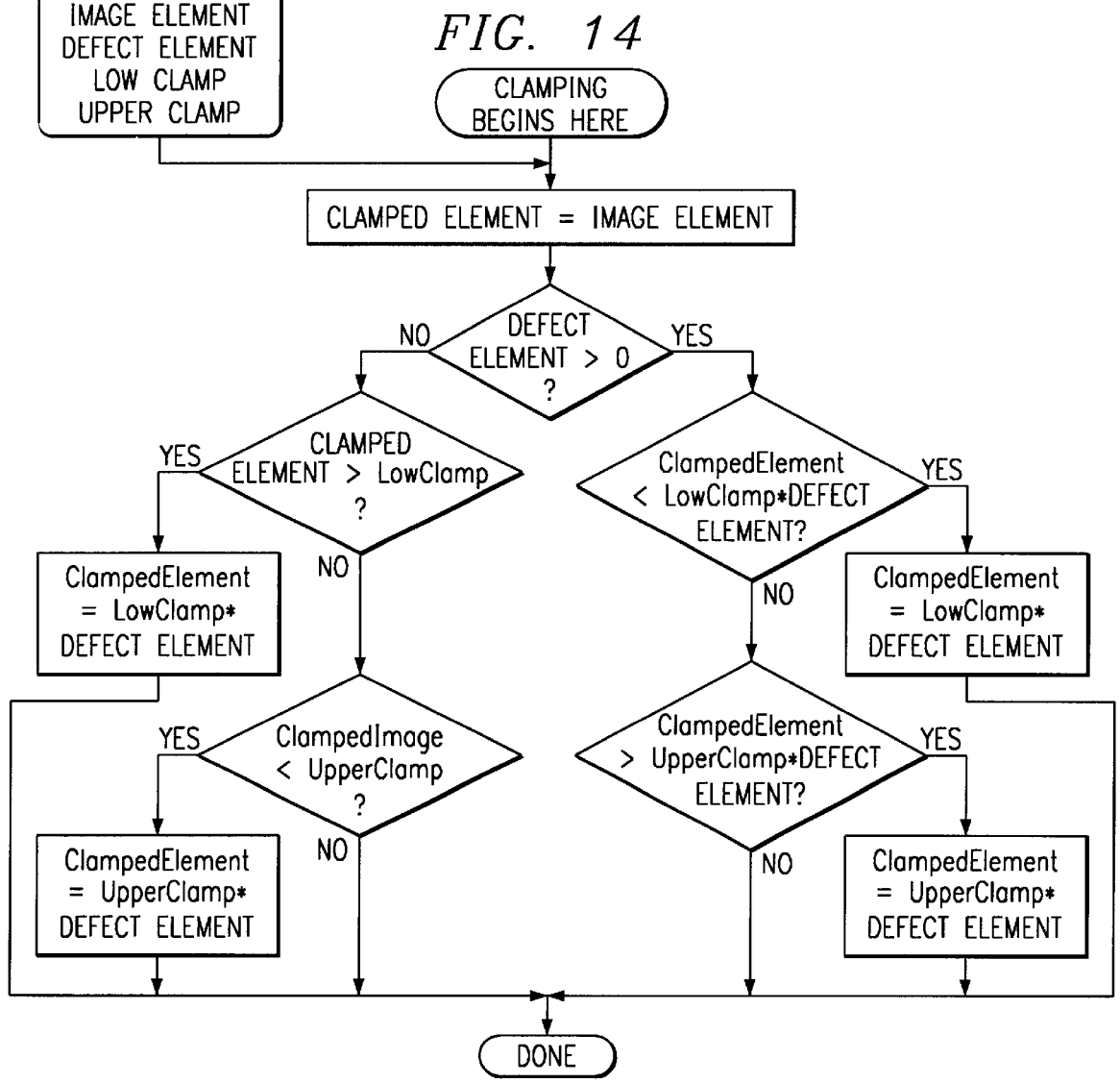
FIG. 14 is a flow diagram indicating the steps in the process of calculating the clamped element.

After the cutoff values are defined, a crosscorrelation and autocorrelation are calculated as illustrated in FIG. 13. Applying the cutoff values from FIG. 12B to the image (also referred to as preclamping) produces a clamped image in which each individual image element is limited to a present value. FIG. 14 illustrates the process of preclamping which is a way of expressing the importance of a particular pixel. Normally, it is expected that a defect in the visible record is about 1.0 times the defect record. The purpose of nulling is to accommodate those cases that deviate from 1.0. The present embodiment preclamps the visible record to between 0.0 and 2.0 times the defect record prior to taking the crosscorrelation and autocorrelation. In this way, the effect of large variations in the visible record are taken into account but are limited in value before the multiplication of the crosscorrelation and autocorrelation are performed. In FIG. 14, this is done by setting the variables Low Clamp equal to 0.0 and Upper Clamp equal to 2.0. If the visible record were, for example, 4.0 times the defect record, the preclamping would treat the situation as though it were only 2.0 times the defect record, but would maintain full weighting, which is mathematically equivalent to letting it be 4.0 while only counting it with half the weight. Another weight which can be used to express confidence in a pixel is based on how far the calculated correction coefficient (defined below) varies from the expected value of unity for each individual pixel. If the variation from unity is far, that pixel is given little weight and vice versa In a specific example, any pixel that gives a single pixel correction coefficient between 0.0 and 2.0 is given full weight. For a correction coefficient beyond these values, the preclamping process effectively reduces weighting of the particular pixel proportional to just how far the correction coefficient is beyond these limits. Upon completion of the process described in FIG. 14, the clamped element rather than the element itself is then used to calculate the crosscorrelation and autocorrelation.

As shown in FIG. 13, the crosscorrelation between the image and the defect record is, for a single pixel, the product of two values, the clamped element multiplied by the defect element. The defect autocorrelation for the same pixel is the defect element value squared. If the crosscorrelation is then divided by the autocorrelation for that single pixel, the result, in theory, is the correction coefficient which is the amount of the defect record present in the image record. However, if this approach is strictly applied, the entire image will be nulled to zero for each pixel, which is obviously undesirable. Instead, only that component of the image that matches the defect should be nulled. This is done by averaging these values over a region. This averaging process or "smudging" is described in FIG. 9B. In one embodiment of the invention, a 3×3 element area is used for the averaging region because it encompasses an average full wave in the pyramid frequency. A larger area would give a more accurate estimate of the correction coefficient; however, smaller areas allow better articulation around the edges of defects which, because of imperfections in the angle of lighting between different colors, may require the correction coefficient to vary pixel by pixel.

After the single element cross and autocorrelations for each element of the 3×3 element region are calculated beginning at step 190, the nine cross correlations are averaged and the nine autocorrelations are averaged at step 192. As previously mentioned, this averaging process across a region is called smudging. The average of the cross correlations is termed the regional crosscorrelation value. The average of the autocorrelations is the regional autocorrelation value. Finally, the regional crosscorrelation divided by the regional autocorrelation to give a gain measuring correlation. For an individual pixel approaching zero defect where both the autocorrelation and crosscorrelation are zero, little is contributed by the pixel to the overall average for its region. On the other hand, at a pixel with a strong defect record, both the crosscorrelation and autocorrelation are large, and the corresponding pixel will contribute significantly to the average for its region.

Figure 15A:
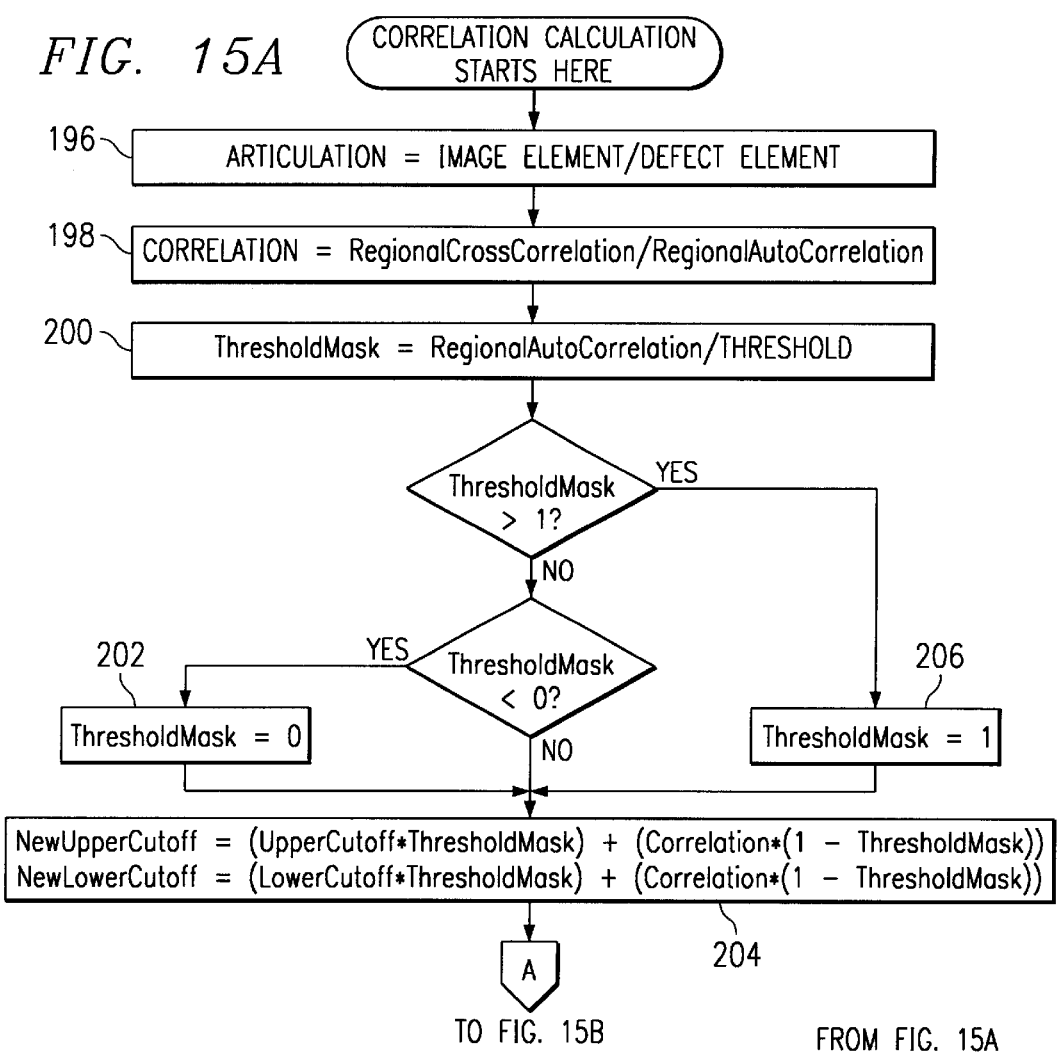
FIGS. 15A and 15B are flow diagrams indicating the steps in the process of calculating the correlation value.
Figure 15B:
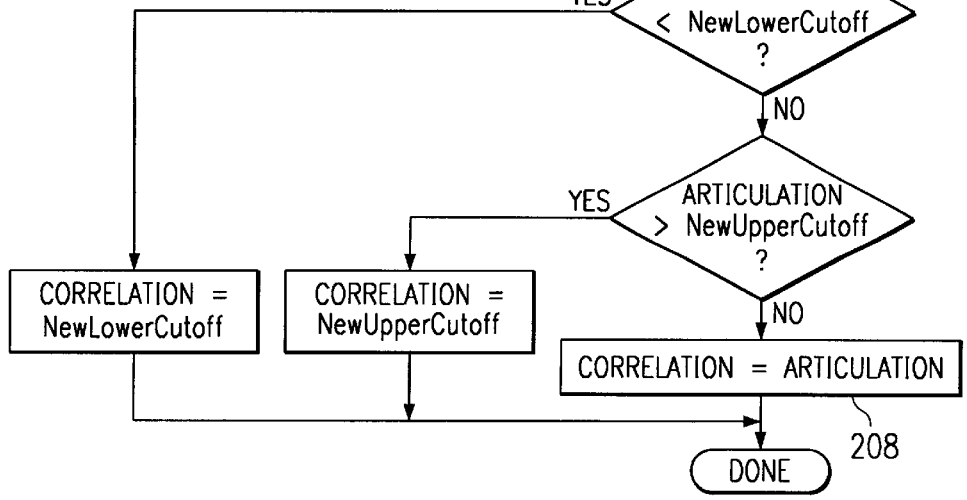

From the regional cross correlation and regional autocorrelation values, the correlation value is determined at step 194 in FIG. 9B. This process is further detailed in FIGS. 15A and 15B. First, an articulation gain value which is the exact gain at a pixel required to null the visible record is calculated at step 196 by dividing the image element by the defect element. This is equivalent to dividing the single element crosscorrelation, or image element multiplied by the defect element, by the single element autocorrelation, or defect element squared. As previously described, the correlation value is obtained by dividing the regional crosscorrelation by the regional autocorrelation at step 198. The threshold mask value is obtained by dividing the regional autocorrelation by a predetermined threshold constant at step 200. In this embodiment, the threshold constant is 0.015. If the autocorrelation, or defect record squared, exceeds this threshold for any pixel, then that pixel is allowed to "articulate" the required correction coefficient for complete cancellation of the visible record at that particular pixel, and change the visible image pixel by pixel, without regional averaging. Note that if the threshold mask is zero at step 202, the new upper cutoff will be equal to the new lower cutoff which is simply equal to the correlation as shown at step 204. If the threshold mask is one at step 206, the new upper cutoff equals the old upper cutoff, originally assumed to be 2.0, and the new lower cutoff equals the old lower cutoff, originally assumed to be 0.0 as seen at step 204. Correlation is set to articulation at step 208 if articulation is between new upper cutoff and new lower cutoff, but is limited to the range between new upper cutoff and new lower cutoff. In effect, if the defect intensity is low, correlation will be left unchanged, but if the defect intensity is high, then correlation will be equal to articulation. In other words, if the defect intensity is high, then the correlation will track articulation for complete nulling of the image in the visible record.

Figure 16:
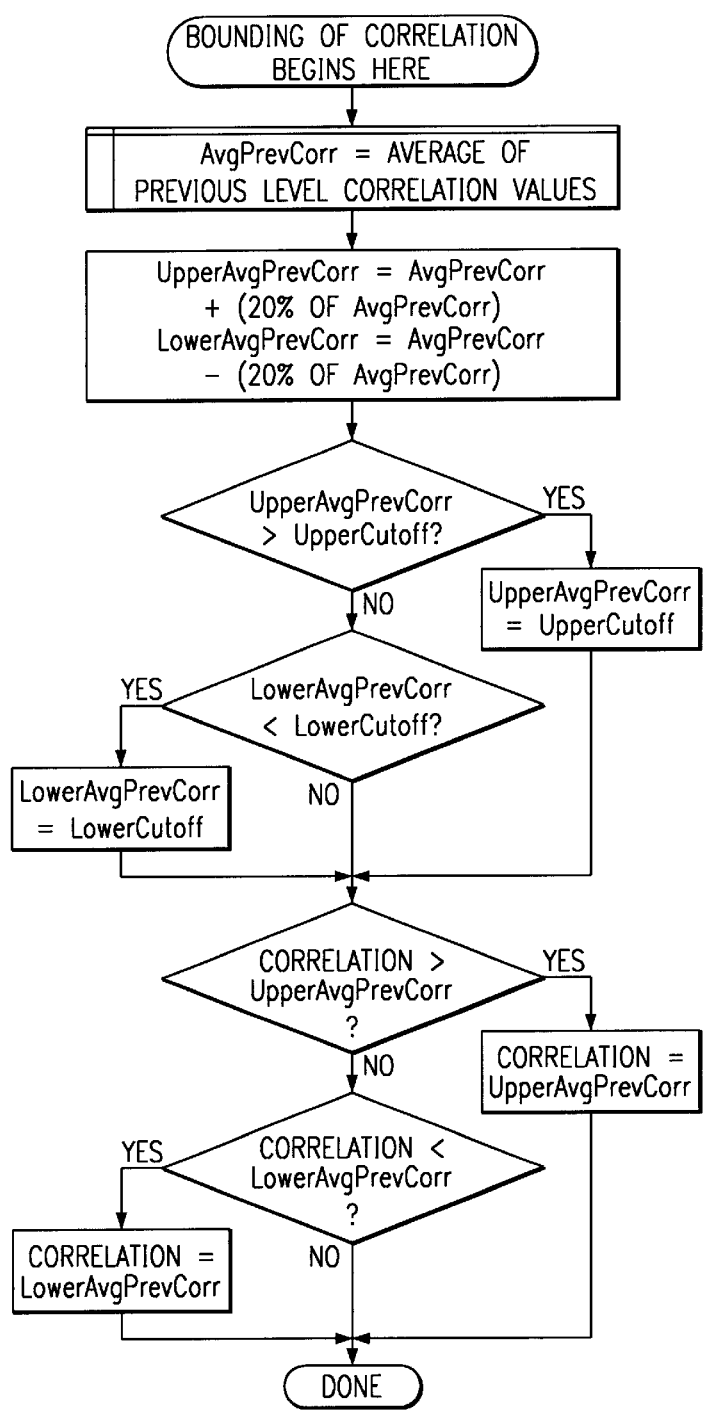
FIG. 16 is a flow diagram indicating the steps in the process of calculating the bound correlation value.

The range of correction is still limited, however, to be close to the average to prevent extreme cancellations outside the range of probability. Using the threshold mask value, new upper and lower cutoff values are generated which serve to bound the correlation value generated above. This process is referred to in FIG. 9B as calculation of the bound correlation value at step 210 and is described in detail in FIG. 16. The upper cutoff and lower cutoff values may be made more restrictive than the full range 0.0 to 2.0. In particular, it has been found to improve reconstruction quality when only the largest pyramid levels have the full range, and the smaller levels are constrained to a narrow range based on values of correlation in corresponding areas of higher levels. FIG. 16 illustrates an algorithm to set the upper cutoff and lower cutoff to be plus and minus 20% from the actual correlation found for the previous larger pyramid level.

Figure 17:
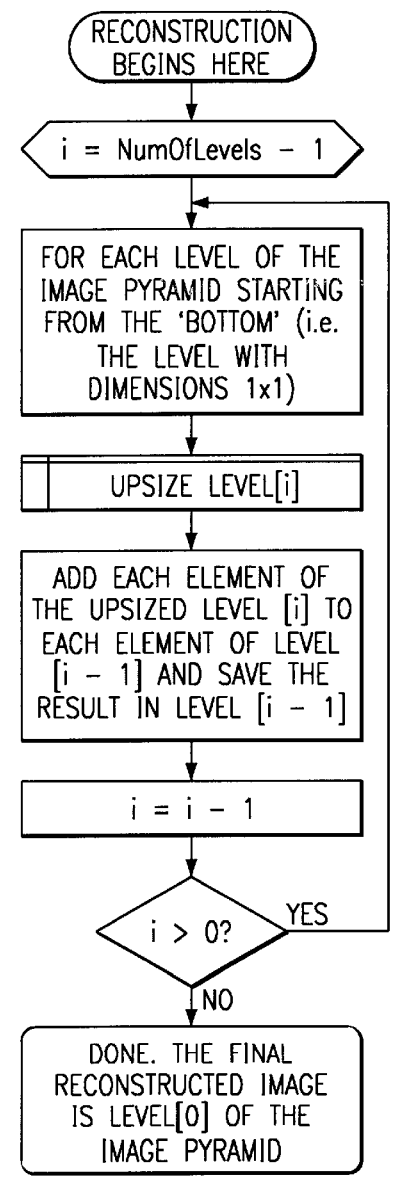
FIG. 17 is a flow diagram indicating the steps in the process of reconstructing the fullpass image.

As shown in FIG. 9B, this new bound correlation value is then used to correct the image element at step 212. The new correlation value is multiplied by the defect element and this product is subtracted from the image element. The image element is now fully corrected. After each image element is corrected in the manner described, reconstruction of the fullpass image begins as illustrated in FIG. 17. Starting from the bottom of the image pyramid, each level is upsized by adding each element of the upsized level to each element of the level below. After all the levels have been added, the reconstruction of the log image is complete. Upon completion, the antilog is taken of the log image and the resulting image can now be displayed, stored, or transmitted.

While this invention has been shown and described with reference to particular embodiments thereof, it will be understood by those skilled in the art that the foregoing and other changes in form and detail may be made therein without departing from the spirit and scope of the invention.

What is claimed is:

1. A method for correcting defects in an image comprising:

applying light to an image storing medium;

receiving from the image storing medium an image signal indicating an image deteriorated by defects;

applying a defect distinguishing radiation to the image storing medium;

receiving from the image storing medium a defect signal, in register with the image signal, indicating the defects in the image;

applying a gain to the defect signal to generate a normalized defect signal;

differencing the image signal and normalized defect signal to generate a recovered image signal; and adjusting the gain to minimize the defects in the recovered image signal.

2. The method of claim 1 wherein the image storing medium is a substrate bearing a two dimensional image.

3. The method of claim 2 wherein the substrate bears a visible image.

4. The method of claim 2 wherein the defect signal indicates the locations and magnitudes of substrate defects.

5. The method of claim 2 wherein the defect signal is received from the substrate in infrared light.

6. The method of claim 1 wherein the step of adjusting the gain to minimize the defects in the recovered image signal comprises the step of measuring the defects in the recovered image signal.

7. The method of claim 6 wherein the step of measuring the defects in the recovered image signal comprises the step of calculating the correlation between the recovered image signal and the defect signal.

8. The method of claim 7 wherein the step of adjusting the gain further comprises the step of altering the gain as a function of the correlation between the recovered image signal and the defect signal.

9. The method of claim 1 wherein the defect signal includes a plurality of defect signal frequency bands, and wherein the gain is adjusted differently between at least two of the bands.

10. The method of claim 9 wherein one of the defect signal frequency bands comprises a defect record of the image signal.

11. The method of claim 9 wherein the defect signal frequency bands are logarithmically spaced by a frequency incrementing factor.

12. The method of claim 11 wherein the frequency incrementing factor is two.

13. The method of claim 9 wherein the defect signal frequency bands are linearly spaced.

14. The method of claim 9 wherein the step of adjusting the gain to minimize the defects in the recovered image signal comprises the step of calculating the correlation between the image signal and at least one of the defect signal frequency bands.

15. The method of claim 14 wherein the step of adjusting the gain further comprises the step of calculating the gain as a function of the correlation between the image signal and at least one of the defect signal frequency bands.

16. The method of claim 9 wherein the defect signal received is further characterized to include a plurality of defect signal regions, and wherein the gain is adjusted differently between at least two of the defect signal regions.

17. The method of claim 16 wherein the step of adjusting the gain to minimize the defects in the recovered image signal comprises the step of calculating the correlation between the image signal and at least two of the defect signal regions.

18. The method of claim 17 wherein the step of adjusting the gain comprises the step of calculating the gain as a function of the correlation between the image signal and at least two of the defect signal regions.

19. The method of claim 18 wherein the step of calculating the gain for a selected defect signal region within a selected defect signal frequency band comprises the steps of calculating the autocorrelation of the defect signal within the selected defect signal region and the defect signal band, and the crosscorrelation of the defect signal within the selected defect signal region and the defect signal band with the image signal.

20. The method of claim 19 wherein the gain within the selected defect signal region and the defect signal band is a function of said crosscorrelation divided by said autocorrelation.

21. The method of claim 20 wherein the defect signal regions are further characterized as comprising of a plurality of points, and wherein the steps of calculating the autocorrelation and the crosscorrelation further includes the steps of calculating the point autocorrelations of the defect signal at the plurality of points and the point cross correlations between the defect signal and the registered image signal at the plurality of points, and averaging the point autocorrelations to obtain the autocorrelation within a region and averaging the point cross correlations to obtain the cross correlations within a region.

22. The method of claim 21 wherein the averaging steps further include spatially lowpass filtering the point autocorrelations to produce a smudged autocorrelation signal containing smudged autocorrelation points, and spatially lowpass filtering the point cross correlations to produce a smudged crosscorrelation signal containing smudged crosscorrelation points.

23. The method of claim 22 wherein the adjusted gain at a selected point of the defect signal is a function of the corresponding smudged autocorrelation point divided by the corresponding smudged crosscorrelation point.

24. The method of claim 16 wherein the defect signal received is further characterized as comprising at least one intermediate region overlapping at least two of the defect signal regions, and wherein the gain is further characterized as changing smoothly across at least two of the defect signal regions and the intermediate region.

25. An apparatus for correcting the effect of defects in an image comprising:

means for applying light to the image storage medium;

means for receiving from the image storing medium an image signal indicating an image deteriorated by defects in the image storage medium;

means for applying a defect distinguishing radiation to the image storage medium;

means for receiving from the image storage medium a defect signal, in register with the image signal, indicating the defects in the image;

means for applying a gain to the defect signal to generate a normalized defect signal;

means for differencing the image signal and normalized defect signal to generate a recovered image signal; and means for adjusting the gain to minimize the defects in the recovered image signal.

26. The apparatus of claim 25 wherein the recording medium is a substrate bearing a two dimensional image.

27. The apparatus of claim 26 wherein the substrate contains a visible image.

28. The apparatus of claim 26 wherein the defect signal is received from the substrate in infrared.

29. The apparatus of claim 25 wherein the gain adjusting means includes means for measuring the defects in the recovered image signal.

30. The apparatus of claim 29 wherein the measuring means comprises means for calculating the correlation between the recovered image signal and the defect signal.

31. The apparatus of claim 25 wherein the gain adjusting means comprises means for altering the gain as a function of the correlation between the recovered image signal and the defect signal.

32. The apparatus of claim 25 wherein the gain adjusting means comprises means for measuring the defects in the image signal.

33. The apparatus of claim 32 wherein the measuring means comprises means for calculating the correlation between the image signal and the defect signal.

34. The apparatus of claim 33 wherein the gain adjusting means comprises means for calculating the gain as a function of the correlation between the image signal and the defect signal.

35. The apparatus of claim 25 wherein the defect signal comprises a plurality of defect signal frequency bands, and wherein the gain is adjusted differently between at least two of the bands.

36. The apparatus of claim 35 wherein one of the defect signal frequency bands is a mean of the defect signal.

37. The apparatus of claim 35 wherein the defect signal frequency bands are logarithmically spaced by a frequency incrementing factor.

38. The apparatus of claim 37 wherein the frequency incrementing factor is two.

39. The apparatus of claim 35 wherein the defect signal frequency bands are linearly spaced.

40. The apparatus of claim 35 wherein the gain adjusting means further comprises means for calculating the correlation between the image signal and at least one of the defect signal frequency bands.

41. The apparatus of claim 40 wherein the gain adjusting means further comprises means for calculating the gain as a function of the correlation between the image signal and at least one of the defect signal frequency bands.

42. The apparatus of claim 35 wherein the defect signal is further characterized by comprising a plurality of defect signal regions, and wherein the gain is adjusted differently between at least two of the regions.

43. A method of processing visual image data with non-image defect data to remove non-image defect information from the visual image data, the non-image defect data being registered with the visual image data, comprising:

creating, from the visual image data, a plurality of visual image data sets for respective spatial frequency bands;

creating from the visual image data a plurality of non-image defect data sets for respective spatial frequency bands substantially similar to the spatial frequency bands for the visual imaging data;

cross correlating the visual image data set and the non-image defect data sets for respective spatial frequency bands to obtain crosscorrelation variables for each of the spatial frequency bands;

autocorrelating the non-image defect data set for each of the spatial frequency bands to obtain autocorrelation variables for each of the spatial frequency bands;

processing the crosscorrelation variables over a plurality of spatial regions to obtain spatially defined crosscorrelation variables for each of the spatial frequency bands;

processing the autocorrelation variables over a plurality of spatial regions substantially similar to the spatial regions of the crosscorrelation variables to obtain spatially defined autocorrelation variables for each of the spatial frequency bands;

processing the spatially defined crosscorrelation variables with the spatially defined autocorrelation variables to obtain spatially defined nulling gains for each of the spatial frequency bands;

applying the spatially defined nulling gains to the respective non-image defect data sets to obtain nulling data sets for the respective spatial frequency bands;

applying the nulling data sets to the visual image data sets for the respective spatial frequency bands to obtain corrected visual image data sets for the respective spatial frequency bands; and merging the corrected visual image data sets for the respective spatial frequency bands to obtain corrected visual image data.

44. The method of claim 43 further comprising identifying a plurality of spatial frequency bands to overcome limitations in real optics and image sensors, the visual image data further comprising a plurality of respective visual image data sets for the spatial frequency bands, the non-image defect data further comprising a plurality of respective non-image defect data sets for the spatial frequency bands, the nulling gain further comprising a plurality of respective nulling gain sets for the spatial frequency bands, and the nulling data further comprising a plurality of respective nulling data sets for the spatial frequency bands.

* * * * *